(12) United States Patent
Hirata et al.

(10) Patent No.: US 12,519,207 B2
(45) Date of Patent: Jan. 6, 2026

(54) MOUNTING MEMBER WITH RFID TAG, MANUFACTURING METHOD FOR MOUNTING MEMBER WITH RFID TAG, HEAD UNIT OF MOUNTING MEMBER WITH RFID TAG, AND RFID TAG MOUNT UNIT

(71) Applicants: General Co., Ltd., Osaka (JP); Osaka Rashi Hambai Co., Ltd., Hannan (JP)

(72) Inventors: Noritaka Hirata, Osaka (JP); Kazuhito Taguchi, Osaka (JP)

(73) Assignees: General Co., Ltd., Osaka (JP); Osaka Fastening Technology Co., Ltd., Osaka (JP)

( * ) Notice: Subject to any disclaimer, the term of this patent is extended or adjusted under 35 U.S.C. 154(b) by 311 days.

(21) Appl. No.: 18/024,854

(22) PCT Filed: Aug. 24, 2021

(86) PCT No.: PCT/JP2021/030954
§ 371 (c)(1),
(2) Date: Mar. 6, 2023

(87) PCT Pub. No.: WO2022/054563
PCT Pub. Date: Mar. 17, 2022

(65) Prior Publication Data
US 2023/0335881 A1    Oct. 19, 2023

(30) Foreign Application Priority Data
Sep. 8, 2020 (JP) ................................. 2020-150415
Sep. 30, 2020 (JP) ................................. 2020-164732

(51) Int. Cl.
*G06K 19/077* (2006.01)
*H01Q 1/22* (2006.01)
*H01Q 9/16* (2006.01)

(52) U.S. Cl.
CPC ..... *H01Q 1/2225* (2013.01); *G06K 19/07758* (2013.01); *H01Q 9/16* (2013.01)

(58) Field of Classification Search
CPC ...... H01Q 1/2225; H01Q 9/16; H01Q 1/2216; H01Q 1/362; H01Q 5/378; H01Q 7/00;
(Continued)

(56) References Cited

U.S. PATENT DOCUMENTS 6,239,737 B1 *   5/2001   Black .................... G06K 19/041
                                                                342/51
6,814,287 B1 *  11/2004   Chang .................... B65D 19/38
                                                                235/492

(Continued)

FOREIGN PATENT DOCUMENTS

CN      105240372      1/2016
JP      2003-6559      1/2003
(Continued)

OTHER PUBLICATIONS

International Search Report issued Nov. 16, 2021 in corresponding International Application No. PCT/JP2021/030954.
(Continued)

*Primary Examiner* — Nay Tun
(74) *Attorney, Agent, or Firm* — Wenderoth, Lind & Ponack, L.L.P.

(57) ABSTRACT

Provided are a mounting member with an RFID tag comprising an RFID tag, the RFID communication sensitivity of which is improved, and a manufacturing method of the mounting member with an RFID tag. The mounting member with an RFID tag comprises a shaft shape unit 1-1, an RFID tag 1-3, a boost antenna 1-4, and a head unit 1-2. The shaft shape unit 1-1 includes a shaft shape insert unit 1-11, and a base unit 1-12 formed by protruding one end part of the insert unit 1-11 in a width direction. The RFID tag 1-3

(Continued)

transmits and receives radio waves. The boost antenna 1-4 boosts the radio waves transmitted and received by the RFID tag 1-3. The head unit 1-2 molds at least a surface side of the base unit 1-12 in order to encapsulate the RFID tag 1-3 and the boost antenna 1-4.

19 Claims, 27 Drawing Sheets

(58) Field of Classification Search
CPC ........ G06K 19/07758; G06K 19/07794; F16B 2200/95; F16B 37/14
See application file for complete search history.

(56) References Cited

U.S. PATENT DOCUMENTS

| | | | | |
|---|---|---|---|---|
| 7,412,898 | B1* | 8/2008 | Smith | F16B 31/025 |
| | | | | 73/761 |
| 8,024,980 | B2* | 9/2011 | Arms | G01L 5/1627 |
| | | | | 73/761 |
| 8,448,520 | B1* | 5/2013 | Baroudi | G01L 5/0038 |
| | | | | 73/761 |
| 9,645,061 | B2* | 5/2017 | Hsieh | G01N 3/08 |
| 10,331,922 | B2* | 6/2019 | Tiwari | H01Q 1/2225 |
| 10,719,748 | B2* | 7/2020 | Salsberg | G06K 19/041 |
| 10,938,447 | B1* | 3/2021 | Sorensen | G06K 19/07777 |
| 2002/0044063 | A1* | 4/2002 | Blagin | F16B 41/005 |
| | | | | 73/761 |
| 2005/0263602 | A1* | 12/2005 | Lin | G06K 19/07798 |
| | | | | 235/492 |
| 2006/0022056 | A1* | 2/2006 | Sakama | G06K 19/07771 |
| | | | | 235/492 |
| 2006/0145868 | A1* | 7/2006 | Chen | G09F 3/0376 |
| | | | | 340/686.1 |
| 2006/0198713 | A1* | 9/2006 | Azzalin | F16B 41/005 |
| | | | | 411/8 |
| 2006/0214791 | A1 | 9/2006 | Tethrake et al. | |
| 2007/0103310 | A1* | 5/2007 | Hopman | G09F 3/0335 |
| | | | | 340/568.2 |
| 2008/0307449 | A1 | 12/2008 | Stobbe et al. | |
| 2008/0309495 | A1* | 12/2008 | Chisholm | G06K 7/10178 |
| | | | | 340/572.1 |
| 2013/0186951 | A1 | 7/2013 | Zhu et al. | |
| 2017/0262671 | A1* | 9/2017 | Tiwari | H01Q 1/2225 |
| 2018/0012047 | A1 | 1/2018 | Chu | |
| 2018/0174015 | A1* | 6/2018 | Destraves | B60C 23/0452 |
| 2019/0012587 | A1* | 1/2019 | Scattergood | H04B 5/26 |
| 2019/0244071 | A1 | 8/2019 | Grove et al. | |

FOREIGN PATENT DOCUMENTS

| | | |
|---|---|---|
| JP | 2003-76966 | 3/2003 |
| JP | 2006-200736 | 8/2006 |
| JP | 2014-238743 | 12/2014 |
| JP | 2019200504 A * | 11/2019 |
| WO | 2006/054508 | 5/2006 |

OTHER PUBLICATIONS

Extended European Search Report issued Aug. 14, 2024 in corresponding European Patent Application No. 21866523.0.

* cited by examiner

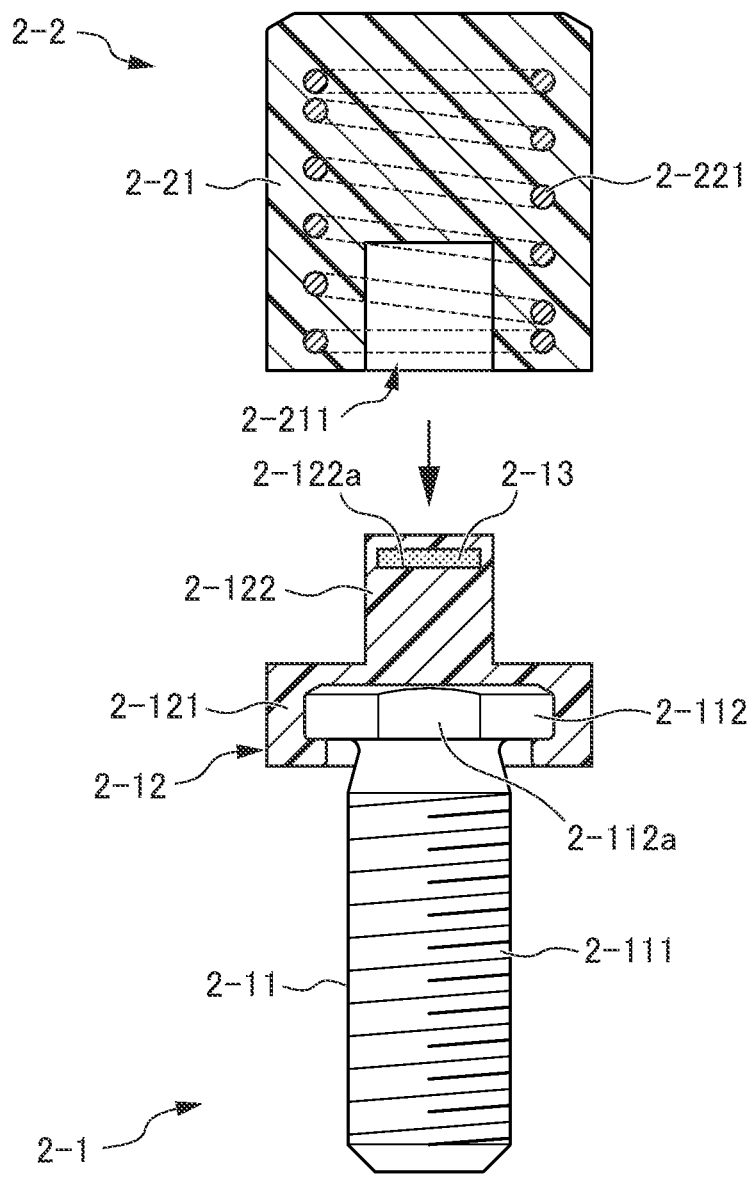

MOUNTING MEMBER WITH RFID TAG, MANUFACTURING METHOD FOR MOUNTING MEMBER WITH RFID TAG, HEAD UNIT OF MOUNTING MEMBER WITH RFID TAG, AND RFID TAG MOUNT UNIT

TECHNICAL FIELD

The present invention relates to an RFID tag-equipped mounting member in which an RFID (Radio Frequency Identification) tag is embedded in a head unit of a mounting member such as a bolt having a head unit or a pin having a head unit, a manufacturing method for an RFID tag-equipped mounting member, a head unit of an RFID tag-equipped mounting member, and an RFID tag mount unit.

BACKGROUND ART

RFID tags are configured by an IC chip to which an antenna is connected, and are classified into active type RFID tags and passive type RFID tags, for example. The active type RFID tag includes its own power source. The passive type RFID tag is driven using radio waves emitted from a reader/writer as energy. The RFID tag communicates data with the reader/writer to read and write various data.

Various RFID tag-equipped mounting members having such an RFID tag have been provided. For example, Patent Document 1 discloses a bolt in which a hole is formed in a top surface of a head unit provided at one end of a screw portion and the hole is used as an accommodating portion for an IC tag (a type of RFID tag). A plate-shaped magnetic body is disposed at a bottom of the accommodating portion. A contactless IC tag of an electromagnetic induction system is placed on the magnetic body. A filling material made of a heat-resistant resin is filled in the magnetic body and the accommodating portion in which the IC tag is accommodated. An opening of the accommodating portion is closed with a lid made of ceramic or heat-resistant resin.

A resin coating layer is formed on an outer peripheral surface of the bolt and an outer surface of the lid. The resin coating layer is formed in a manner that a resin powder is attached to the outer peripheral surface of the bolt and the outer surface of the lid, the resin powder is molten by heating, and the molten resin powder is cooled. The molten resin powder also enters a gap between the accommodating portion of the bolt and the lid and the filling material. Foreign matter such as dust and rainwater does not enter the gap due to the resin which has entered. The bolt covered with the resin coating layer and embedding the IC tag is used as an IC tag attaching structure to manage information of devices and machines.

Patent Document 1: Japanese Unexamined Patent Application, Publication No. 2014-238743

Disclosure of the Invention

Problems to be Solved by the Invention

In the IC tag attaching structure disclosed in Patent Document 1, an IC tag accommodating portion is formed in a head unit of a bolt. A peripheral wall surrounding the IC tag is formed in the accommodating portion. Further, the bolt is generally molded from metals, for example, steel materials and alloy materials. Therefore, particularly when the IC tag is a passive type RFID tag, communication sensitivity is hindered by the peripheral wall.

The IC tag attaching structure disclosed in Patent Document 1 wirelessly communicates with the reader/writer using the IC tag embedded in the head unit of the bolt. The sensitivity characteristics of the wireless communication change variously and diversely, depending on a change of usage situations for various demands, for example, usage situations such as process management, inventory management, and maintenance on a manufacturing line where the IC tag attaching structure is attached.

The present invention is to provide an RFID tag-equipped mounting member and a manufacturing method for an RFID tag-equipped mounting member in which the RFID tag-equipped mounting member provided with an RFID tag has good RFID communication sensitivity, and is to provide a head unit of an RFID tag-equipped mounting member, an RFID tag mount unit, and an RFID tag-equipped mounting member, which are compatible with sensitivity characteristics of wireless communication changing variously and diversely depending on usage situations.

Means for Solving the Problems

An RFID tag-equipped mounting member according to the present invention includes:
  a shaft-shaped unit including an insert portion having a shaft shape and a base portion provided at one end of the insert portion so as to protrude in a width direction;
  an RFID tag that transmits and receives radio waves;
  a boost antenna that boosts the radio waves transmitted and received by the RFID tag; and
  a head unit that seals or embeds at least the boost antenna.
  In the RFID tag-equipped mounting member according to the present invention, the head unit is molded to at least an upper surface of the base portion with resin so as to seal the RFID tag and the boost antenna (first RFID tag-equipped mounting member).
  In the (first) RFID tag-equipped mounting member according to the present invention,
  the boost antenna is a coil spring-shaped conductor with the RFID tag disposed therein.
  In the (first) RFID tag-equipped mounting member according to the present invention,
  the head unit includes a pedestal that allows the RFID tag to be located at an intermediate part or a tip part of the boost antenna in a length direction.
  In the (first) RFID tag-equipped mounting member according to the present invention,
  the head unit is formed in a columnar shape or in a truncated cone shape in which a diameter is reduced or enlarged gradually, and
  the boost antenna having the coil spring is formed in a cylindrical shape or a conical shape that matches an outer shape of the head unit.
  In the RFID tag-equipped mounting member according to the present invention,
  the head unit includes a rib that is formed in a thumbscrew shape or a flat plate shape to protrude in a radial direction of the insert portion, and
  the boost antenna expands in a whole of the head unit (second RFID tag-equipped mounting member).
  In the (second) RFID tag-equipped mounting member according to the present invention, the boost antenna has a meandering conductor pattern.
  In the (second) RFID tag-equipped mounting member according to the present invention,
  the head unit and the meandering boost antenna are wider toward a tip side.

In the (second) RFID tag-equipped mounting member according to the present invention,
the boost antenna has a U-shape or a zigzag shape including a plurality of stick-shaped portions arranged in parallel in an axial direction of the insert portion and a folded portion that is folded back at one protruding end side, and
the RFID tag is sandwiched between the stick-shaped portions.

In the (second) RFID tag-equipped mounting member according to the present invention,
the boost antenna is a twice-folded member, and
the RFID tag is sandwiched by the twice-folded member.

A manufacturing method for the (first) RFID tag-equipped mounting member according to the present invention includes:
a step of fixing the pedestal for mounting the RFID tag to the base portion;
a step of mounting the RFID tag on the pedestal;
a step of setting the boost antenna on the pedestal; and
molding the pedestal, the RFID tag, and the boost antenna with resin.

In the manufacturing method for the (first) RFID tag-equipped mounting member according to the present invention, the step of fixing the pedestal to the base portion includes: a step of forming a fitting recess in the base portion; and a step of forming a fitting projection on the pedestal and fitting the fitting projection into the fitting recess.

A manufacturing method for the (first) RFID tag-equipped mounting member different from the above-described manufacturing method according to the present invention is a manufacturing method for the (first) RFID tag-equipped mounting member according to the present invention, the manufacturing method including:
a step of fixing the pedestal for mounting the RFID tag to the base portion;
a step of setting the boost antenna on the base portion;
a step of insert-molding an original form of the head unit with resin so as to embed the boost antenna;
a step of forming a hole extending toward a central portion from a top surface of the original form of the head unit and mounting the RFID tag inside the hole; and
a step of filling the hole with molten resin or inserting a resin plug into the hole to form the head unit.

A manufacturing method for the (second) RFID tag-equipped mounting member according to the present invention includes: a step of in-mold semi-molding one side half of the head unit so as to have a recess for fitting the boost antenna and include the base portion of the shaft-shaped unit;
a step of setting the RFID tag and the boost antenna in the recess; and
a step of in-mold semi-molding another side half of the head unit so as to cover the RFID tag and the boost antenna.

A manufacturing method for the (second) RFID tag-equipped mounting member different from the above-described manufacturing method according to the present invention includes:
a step of in-mold semi-molding one side half of the head unit so as to have a positioning boss for positioning the boost antenna and include the base portion of the shaft-shaped unit;
a step of positioning the RFID tag and the boost antenna using the positioning boss and setting the RFID tag and the boost antenna in the insert portion; and
a step of in-mold semi-molding another side half of the head unit so as to cover the RFID tag and the boost antenna.

A head unit of an RFID tag-equipped mounting member according to the present invention is
a head unit of the RFID tag-equipped mounting member provided in the RFID tag-equipped mounting member according to the present invention, the head unit being configured to be capable of being detachably attached to an RFID tag mount unit including the shaft-shaped unit, the RFID tag, and a pedestal having a protrusion portion,
the head unit including a cap having a recessed fitting portion into which the protrusion portion is inserted.

In the head unit of the RFID tag-equipped mounting member according to the present invention,
the RFID tag mount unit includes a base portion in which the shaft-shaped unit protrudes in a cross-sectional direction at one end, and the pedestal includes an expansion portion surrounding the base portion, and
the cap includes a stepped hole into which the expansion portion is inserted.

In the head unit of the RFID tag-equipped mounting member according to the present invention,
the boost antenna includes an element formed in a coil shape, and
the cap is formed in a one end closed tube shape.

In the head unit of the RFID tag-equipped mounting member according to the present invention,
the boost antenna includes a shaft-shaped or conductive flat plate protruding in a cross-sectional direction of the shaft-shaped unit, and
the cap includes a rib that molds the boost antenna.

In the head unit of the RFID tag-equipped mounting member according to the present invention,
the boost antenna includes an element having a loop portion surrounding the RFID tag, and
the cap includes a central portion that molds the loop portion.

In the head unit of the RFID tag-equipped mounting member according to the present invention,
the boost antenna is patterned in a meandering shape and includes an element protruding in a cross-sectional direction of the shaft-shaped unit, and
the cap includes a rib that molds the element.

An RFID tag mount unit according to the present invention is
capable of being detachably attached to a head unit of an RFID tag-equipped mounting member in which a boost antenna for boosting radio waves transmitted and received by an RFID tag and a cap formed in a cylindrical shape with one end closed to mold the boost antenna are integrated, the RFID tag mount unit including:
a shaft-shaped unit including an insert portion having a shaft shape; a pedestal fixed to one end of the shaft-shaped unit; and an RFID tag mounted on the pedestal to transmit and receive the radio waves.

In the RFID tag mount unit according to the present invention,
the shaft-shaped unit includes a base portion that protrudes in a cross-sectional direction at one end of the insert portion and is surrounded by an expansion portion provided on the pedestal of the head unit of the RFID tag-equipped mounting member.

An RFID tag-equipped mounting member according to the present invention includes:
- an RFID tag mount unit including a shaft-shaped unit having a shaft-shaped insert portion, a pedestal fixed to one end of the shaft-shaped unit and having a protrusion portion, and an RFID tag mounted on the pedestal to transmit and receive radio waves; and
- a head unit of the RFID tag-equipped mounting member including a boost antenna that boosts the radio waves transmitted and received by the RFID tag and a cap that molds the boost antenna and is formed with a recessed fitting portion into which the protrusion portion is inserted, and
- when the protrusion portion of the pedestal of the RFID tag mount unit is inserted into the recessed fitting portion of the cap, the RFID tag mount unit is attached to the head unit of the RFID tag-equipped mounting member such that the boost antenna surrounds the RFID tag, and when the pedestal of the RFID tag mount unit is removed from the recessed fitting portion of the cap, the RFID tag mount unit is separated from the head unit of the RFID tag-equipped mounting member.

In the RFID tag-equipped mounting member according to the present invention,
- the shaft-shaped unit includes a base portion provided at one end of the insert portion so as to protrude in a width direction, and
- the pedestal includes an expansion portion that surrounds the base portion.

Effects of the Invention

According to the present invention, it is possible to provide an RFID tag-equipped mounting member and a manufacturing method for an RFID tag-equipped mounting member in which the RFID tag-equipped mounting member provided with an RFID tag has good RFID communication sensitivity.

According to the present invention, it is possible to provide a head unit of an RFID tag-equipped mounting member, an RFID tag mount unit, and an RFID tag-equipped mounting member, which are compatible with sensitivity characteristics of wireless communication changing variously and diversely depending on usage situations.

BRIEF DESCRIPTION OF THE DRAWINGS

FIG. 22 is a cross-sectional front view showing a head unit of an RFID tag-equipped mounting member and an RFID tag mount unit according to a first example of Embodiment 2-1 of the present invention;

Preferred Mode for Carrying Out the Invention

Embodiment 1-1

Figure 1:
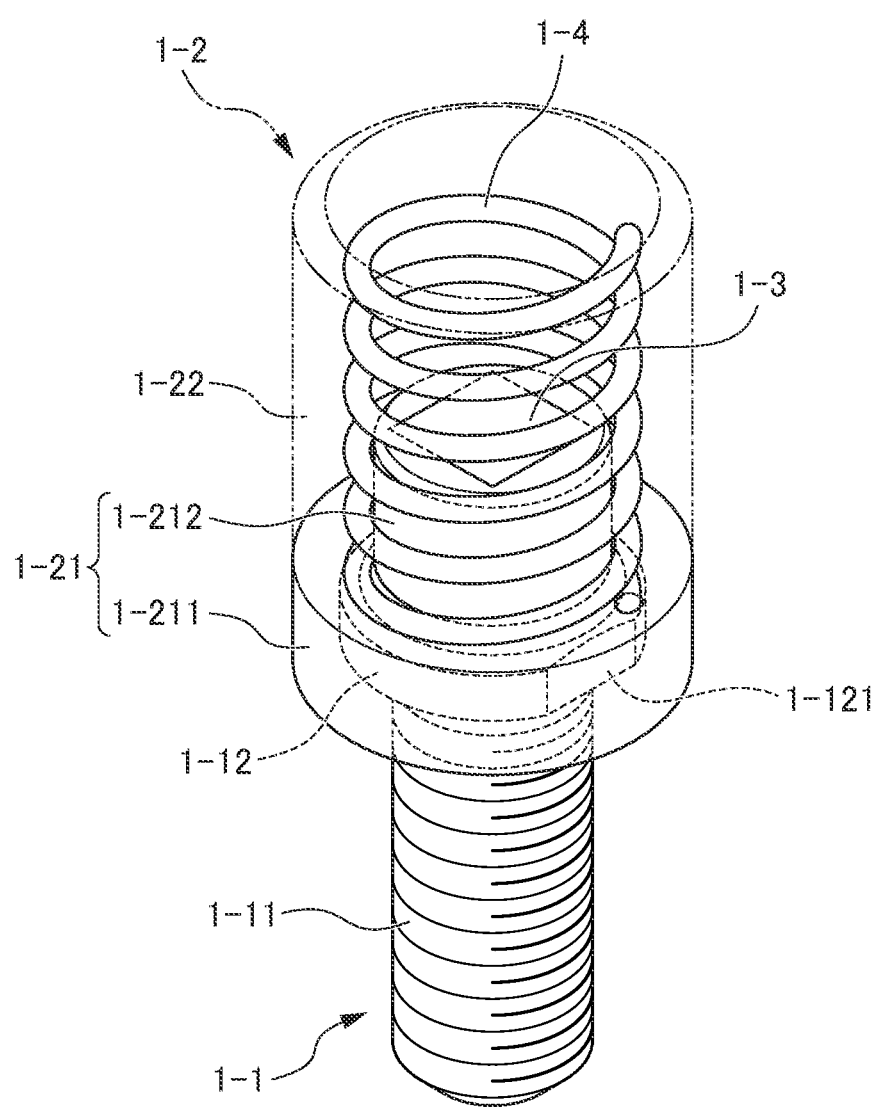
FIG. 1 is a perspective view showing an RFID tag-equipped mounting member according to a first example of Embodiment 1-1 of the present invention.
Figure 2:
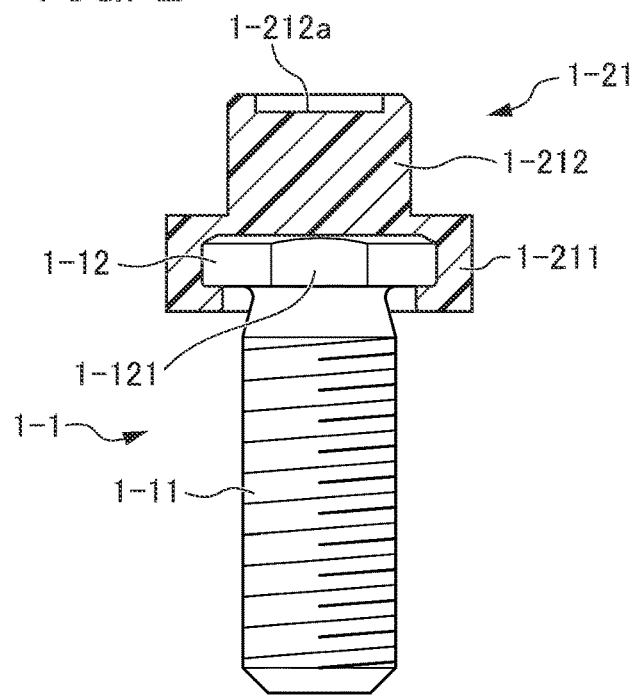
FIG. 2 is a cross-sectional front view showing an initial process of a manufacturing method for the RFID tag-equipped mounting member according to the first example of Embodiment 1-1 of the present invention.
Figure 3:
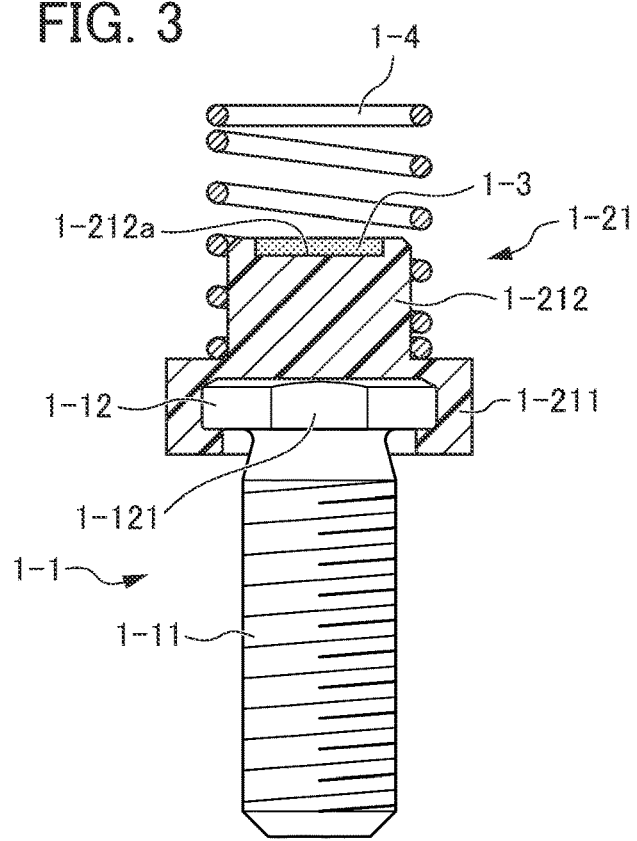
FIG. 3 is a cross-sectional front view showing an intermediate process of a manufacturing method for the RFID tag-equipped mounting member according to the first example of Embodiment 1-1 of the present invention.
Figure 4:
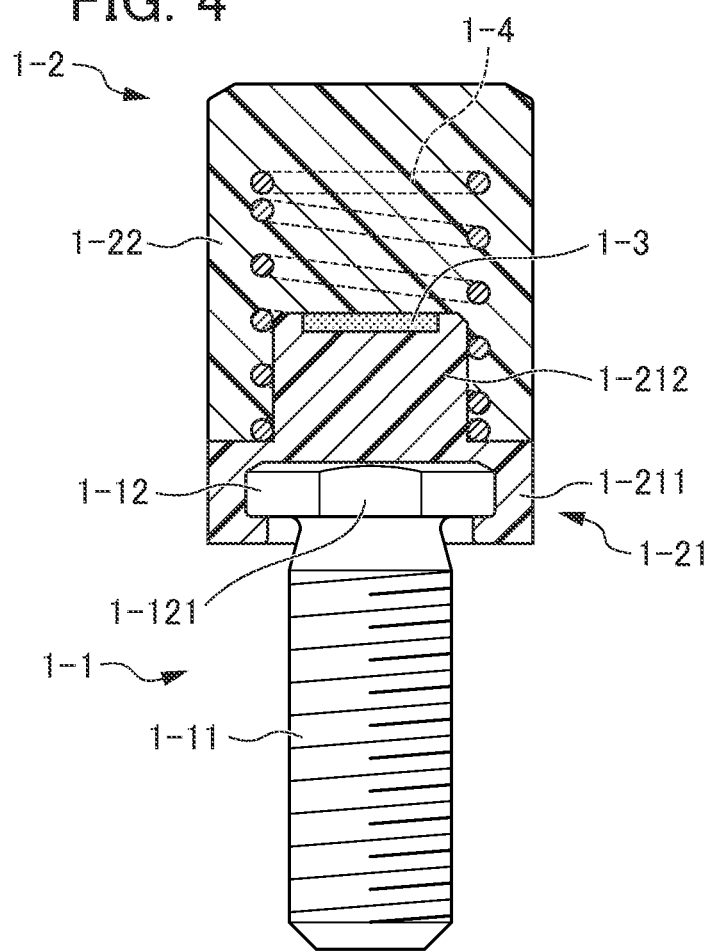
FIG. 4 is a cross-sectional front view showing a final process of a manufacturing method for the RFID tag-equipped mounting member according to the first example of Embodiment 1-1 of the present invention.

A first example of an RFID tag-equipped mounting member according to Embodiment 1-1 of the present invention will be described with reference to FIGS. 1 to 4. FIG. 1 is a perspective view showing an RFID tag-equipped mounting member according to a first example of Embodiment 1-1 of the present invention. FIG. 2 is a cross-sectional front view showing an initial process of a manufacturing method for the RFID tag-equipped mounting member according to the first example of Embodiment 1-1 of the present invention. FIG. 3 is a cross-sectional front view showing an intermediate process of a manufacturing method for the RFID tag-equipped mounting member according to the first example of Embodiment 1-1 of the present invention. FIG. 4 is a cross-sectional front view showing a final process of a manufacturing method for the RFID tag-equipped mounting member according to the first example of Embodiment 1-1 of the present invention.

The RFID tag-equipped mounting member includes not only fastening members such as bolts and screws that are screwed with female screws and nuts, but also pins that are inserted into shaft holes. However, in Embodiment 1-1 (the same applies to Embodiment 1-2 to be described below), since a mounting member such as a bolt is an example of as the RFID tag-equipped mounting member, an "RFID tag-equipped bolt" will be mainly described below. As shown in FIG. 1, the RFID tag-equipped bolt includes a shaft-shaped unit 1-1, a head unit 1-2, an RFID (Radio Frequency Identification) tag 1-3, and a boost antenna 1-4.

The shaft-shaped unit 1-1 includes an insert portion 1-11 and a base portion 1-12. The insert portion 1-11 and the base portion 1-12 are made of metal such as aluminum or stainless steel. The insert portion 1-11 is formed with a male screw in a shaft shape. However, a male screw is not formed in the vicinity of one end (a portion continuous with the base portion 1-12) of the insert portion 1-11.

The base portion 1-12 is provided at one end of the insert portion 1-11 so as to protrude in a width direction. The width direction is a direction orthogonal to a length direction of the insert portion 1-11. The width direction in the insert portion 1-11 formed with the male screw can be called a radial direction. The base portion 1-12 is formed in a disc shape. A center of the disc-shaped base portion 1-12 coincides with a center in the radial direction of the insert portion 1-11. A flat chamfered portion 1-121 is formed on a part of an outer peripheral surface of the base portion 1-12.

The head unit 1-2 is formed in which a pedestal 1-21 mounted with the RFID tag 1-3 on a top surface and a cap 1-22 covering a main part of the pedestal 1-21 are integrated.

The pedestal 1-21 is molded with resin on an upper surface of the base portion 1-12 where the insert portion 1-11 is not present. As shown in FIG. 2, the pedestal 1-21 includes an enlarged diameter portion 1-211 and a protrusion portion 1-212. The enlarged diameter portion 1-211 is formed in a ring shape surrounding an outer periphery of the base portion 1-12. A part of an inner surface of the enlarged diameter portion 1-211 is formed with an arcuate locking portion (not shown) so as to engage with the chamfered portion 1-121 of the base portion 1-12. The protrusion portion 1-212 protrudes from the center of the upper surface of the base portion 1-12 in a columnar or polygonal columnar shape in a direction opposite to the insert portion 1-11. A grooved or dented middle lower portion 1-212a is formed on a top end surface of the protrusion portion 1-212 to mount the RFID tag 1-3. As shown in FIGS. 1 and 3, the protrusion portion 1-212 is surrounded by a half of a base end side (a lower side in the drawing) of a coil spring-shaped boost antenna 1-4.

As shown in FIG. 4, the cap 1-22 is a portion that covers the protrusion portion 1-212 of the pedestal 1-21, and is molded in a columnar shape so as to seal the RFID tag 1-3 and the boost antenna 1-4 with resin. The cap 1-22 protrudes from the upper surface of the base portion 1-12 with a length slightly longer than or substantially equal to that of the insert portion 1-11, and is provided with the same outer diameter as the enlarged diameter portion 1-211. The cap 1-22 is insert-molded by a mold (not shown). Although not shown, the outer peripheral surface of the cap 1-22 may be formed with a flat-shaped knurl in the length direction.

The RFID tag 1-3 is a passive tag. In other words, the RFID tag 1-3 does not embed a battery, and is driven by receiving radio waves from a reader/writer (not shown) and using the radio waves as power source. The RFID tag 1-3 is an ultra-compact (for example, a length, a width, and a thickness being 2.5 mm, 2.5 mm, and 0.375 mm, respectively) chip-shaped electronic component in which an IC chip for recording information and an antenna used for wireless communication are combined. The RFID tag 1-3 is mounted on the middle lower portion 1-212a formed on the top surface of the protrusion portion 1-212 of the head unit 1-2, and is sealed by the cap 1-22 of the head unit 1-2 with resin molding.

The boost antenna 1-4 is formed in a shape of a cylindrical coil spring surrounding the protrusion portion 1-212 of the pedestal 1-21, and boosts radio waves transmitted and received from/to the RFID tag 1-3. The boost antenna 1-4, which is shown, is drawn for easy viewing, and the actual boost antenna 1-4 may be formed to have a pitch, a wire diameter, and the number of winding turns, not shown. The boost antenna 1-4 is formed by a conductor including various metals. The cylindrical coil spring-shaped boost antenna 1-4 has a base end fixed to the upper surface of the enlarged diameter portion 1-211, a half of the base end side surrounding the protrusion portion 1-212, and a half of a tip side extending from the top surface of the protrusion portion 1-212. The protrusion portion 1-212 is preferably at least half the length of the boost antenna 1-4. The RFID tag 1-3 is disposed in a middle part of the boost antenna 1-4 in the length direction. The RFID tag 1-13 is disposed at a position away from the metal base portion 1-12 so as to surrounded by the boost antenna 1-4. The boost antenna 1-4 is not electrically connected to the RFID tag 1-3. The boost antenna 1-4 is magnetically coupled to the antenna contained in the RFID tag 1-3.

Here, a first manufacturing method of the RFID tag-equipped bolt according to the first example of the Embodiment 1-1 will be described with reference to FIGS. 2 to 4. The first manufacturing method of the RFID tag-equipped bolt is divided into an initial process, an intermediate process, and a final process.

Although not shown, in the initial process, the shaft-shaped unit 1-1 and the pedestal 1-21 are individually manufactured. As shown in FIG. 2, in the next step of the initial process, the pedestal 1-21 is insert-molded with molten resin. In order words, the enlarged diameter portion 1-211 of the pedestal 1-21 surrounds the outer peripheral surface of the base portion 1-12, and the pedestal 1-21 is insert-molded such than the protrusion portion 1-212 of the pedestal 1-21 protrude from the upper surface of the base portion 1-12. A middle lower portion 1-212a is formed on a top surface of the protrusion portion 1-212.

As shown in FIG. 3, in the intermediate process, the RFID tag 1-3 is mounted on the top surface by fitting into the middle lower portion 1-212a of the protrusion portion 1-212 of the pedestal 1-21 molded in the initial stage, and the base end of the boost antenna 1-4 is installed on the enlarged diameter portion 1-211 of the pedestal 1-21. A component in which the RFID tag 1-3 is disposed inside the boost antenna 1-4 is called a tag block.

The protrusion portion 1-212 of the pedestal 1-21 and the tag block (RFID tag 1-3 and boost antenna 1-4) are set in a cavity of a mold (not shown). The cavity of the mold is a space used for insert-molding the cap 1-22 of the head unit 1-2 with resin. Molten resin is filled into the cavity in a state where the mold is closed. The molten resin is the same as the molten resin used to mold the pedestal 1-21. When the molten resin solidifies, the RFID tag-equipped bolt 1-3 having the molded cap 1-22 is completed. Since being molded with the same molten resin, the pedestal 1-21 and the cap 1-22 are integrated to the extent that the boundary surface is invisible or difficult to understand. In FIG. 4, the pedestal 1-21 and the cap 1-22 are hatched in opposite directions so as to be easily distinguished from each other.

In the final process, the mold is opened to take out the RFID tag-equipped bolt from the cavity. As shown in FIG. 4, the RFID tag-equipped bolt is configured in which the cap 1-22 of the head unit 1-2 seals the tag block (RFID tag 1-3 and boost antenna 1-4). Since the cap 1-22 of the head unit 1-2 and the pedestal 1-21 are integrally molded with the same resin, the cap 1-22 is integrated so as not to slip in a circumferential direction and the length direction. Further, the enlarged diameter portion 1-211 of the pedestal 1-21 and the outer peripheral surface of the base portion 1-12 are linearly engaged with an engaging portion and the chamfered portion 1-121, respectively, and thus the head unit 1-2 and the base portion 1-12 do not idle.

Figure 5:
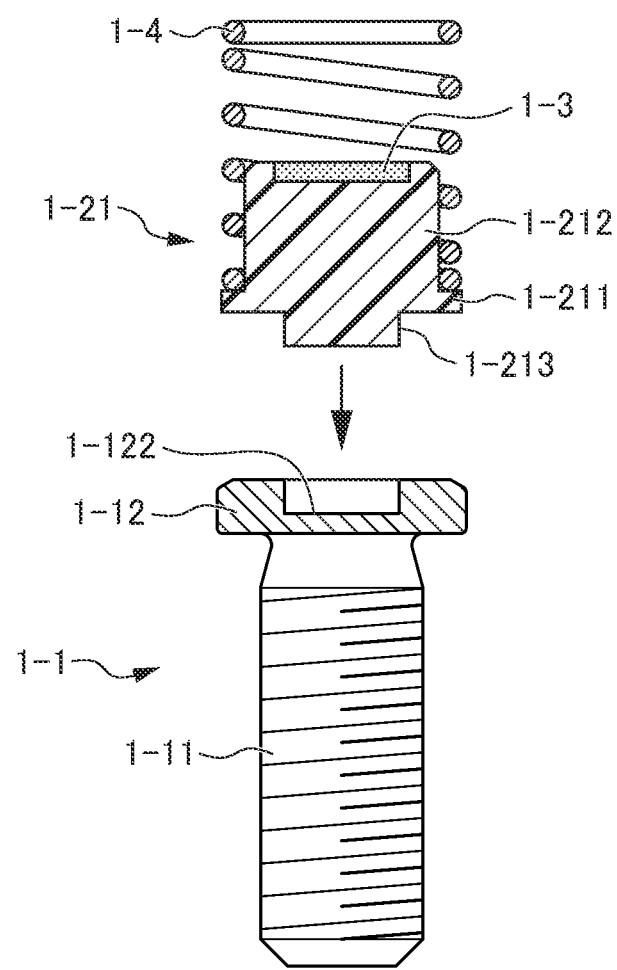
FIG. 5 is a cross-sectional front view showing an initial process of a manufacturing method for the RFID tag-equipped mounting member according to a second example of Embodiment 1-1 of the present invention.
Figure 6:
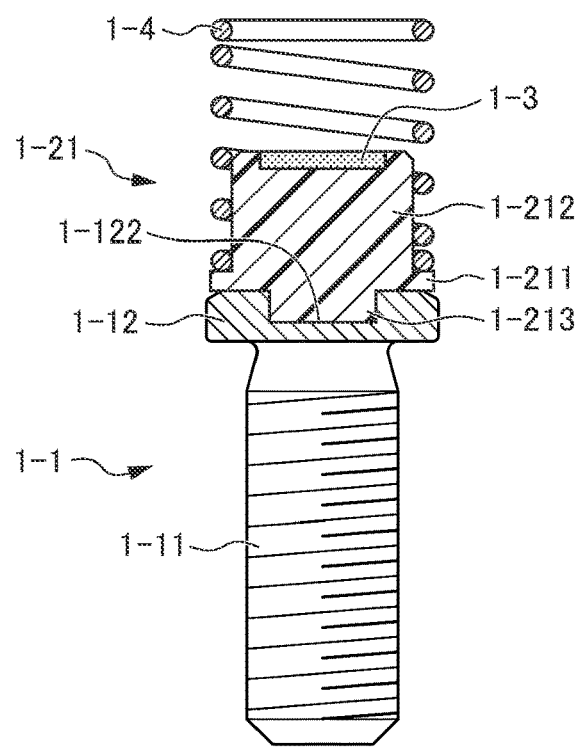
FIG. 6 is a cross-sectional front view showing an intermediate process of the manufacturing method for the RFID tag-equipped mounting member according to the second example of Embodiment 1-1 of the present invention.
Figure 7:
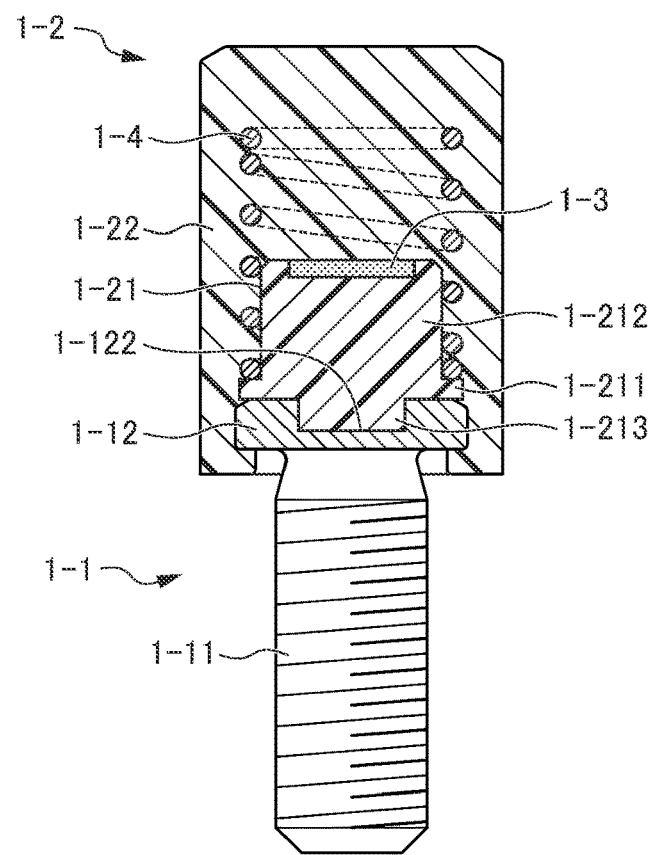
FIG. 7 is a cross-sectional front view showing a final process of the manufacturing method for the RFID tag-equipped mounting member according to the second example of Embodiment 1-1 of the present invention.

Next, a manufacturing method for a RFID tag-equipped bolt according to a second example of Embodiment 1-1 will be described with reference to FIGS. 5 to 7 which show an initial process, an intermediate process, a final process, respectively. FIG. 5 is a cross-sectional front view showing an initial process of the manufacturing method for the RFID tag-equipped mounting member according to the second example of Embodiment 1-1 of the present invention. FIG. 6 is a cross-sectional front view showing an intermediate process of the manufacturing method for the RFID tag-equipped mounting member according to the second example of Embodiment 1-1 of the present invention. FIG. 7 is a cross-sectional front view showing a final process of the manufacturing method for the RFID tag-equipped mounting member according to the second example of Embodiment 1-1 of the present invention.

As shown in FIGS. 5 to 7, the RFID tag-equipped bolt according to the second example of Embodiment 1-1 is configured in which a fitting recess 1-122 is formed at a center of an upper surface of a base portion 1-12 of a shaft-shaped unit 1-1 and a fitting projection 1-213 is formed at a center of a base end surface of an enlarged diameter portion of a pedestal 1-21. In the RFID tag-equipped bolt, the fitting projection 1-213 is inserted into the fitting recess 1-122, and thus the pedestal 1-21 and the base portion 1-12 are integrated. A boost antenna 1-4 is formed in a coil spring shape as in the first example.

In the initial process of manufacturing the RFID tag according to the second example, the shaft-shaped unit 1-1 and the pedestal 1-21 are individually manufactured. As shown in FIG. 5, in the initial process, an RFID tag 1-3 is further mounted on a middle lower portion 1-212a of a protrusion portion 1-212 of the pedestal 1-21. Further, a boost antenna 1-4 is set on an enlarged diameter portion 1-211 of the pedestal 1-21. The RFID tag 1-3 is located midway in the length direction of the boost antenna 1-4. The RFID tag 1-3 mounted on the protrusion portion 1-212 and the boost antenna 1-4 are combined to form a tag block.

In the intermediate process as shown in FIG. 6, the fitting projection 1-213 of the pedestal 1-21 is fitted into the fitting recess 1-122 of the base portion 1-12. The boost antenna 4 may be externally mounted on the protrusion portion 1-212 after the fitting projection 1-213 of the pedestal 1-21 is fitted into the fitting recess 1-122 of the base portion 12. In the intermediate process, the tag block (RFID tag and boost antenna 4), the pedestal 1-21, and the base portion 1-12 are set in a mold. Then, the same molten resin as that used for the pedestal is injected into a cavity in a state where the mold is closed. When the molten resin solidifies, the RFID tag-equipped bolt forming a cap 1-22 is completed. Since being molded with the same molten resin, the pedestal 1-21 and the cap 1-22 are integrated to the extent that the boundary surface is invisible or difficult to understand.

In the final process, the mold is opened to take out the RFID tag-equipped bolt from the cavity. Similarly to the RFID tag-equipped bolt manufactured by the manufacturing method of the first example, the RFID tag-equipped bolt is configured in which the head unit 1-2 is formed by integrating the pedestal 1-21 and the cap 1-22. Therefore, when the head unit 1-2 of the RFID tag-equipped bolt is rotated in the circumferential direction, the shaft-shaped unit 1-1 is rotated integrally without idling.

Figure 8:
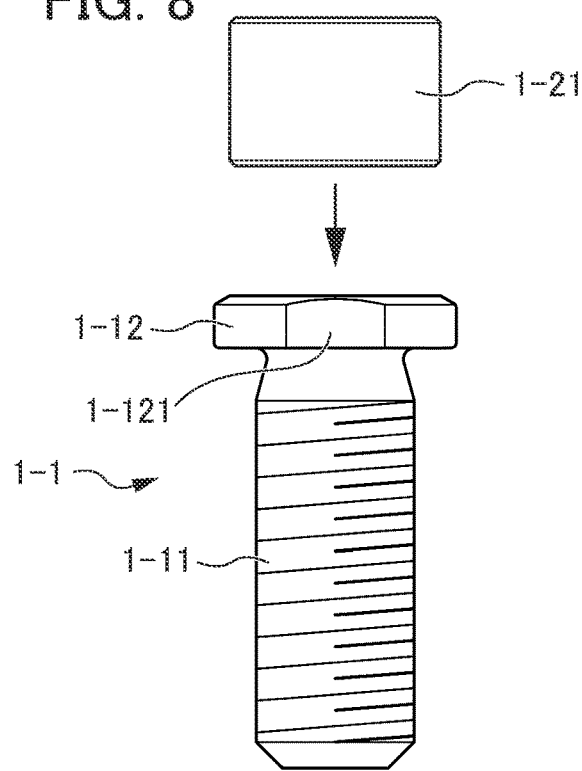
FIG. 8 is a cross-sectional front view showing an initial process of a manufacturing method for the RFID tag-equipped mounting member according to a third example of Embodiment 1-1 of the present invention.
Figure 9:
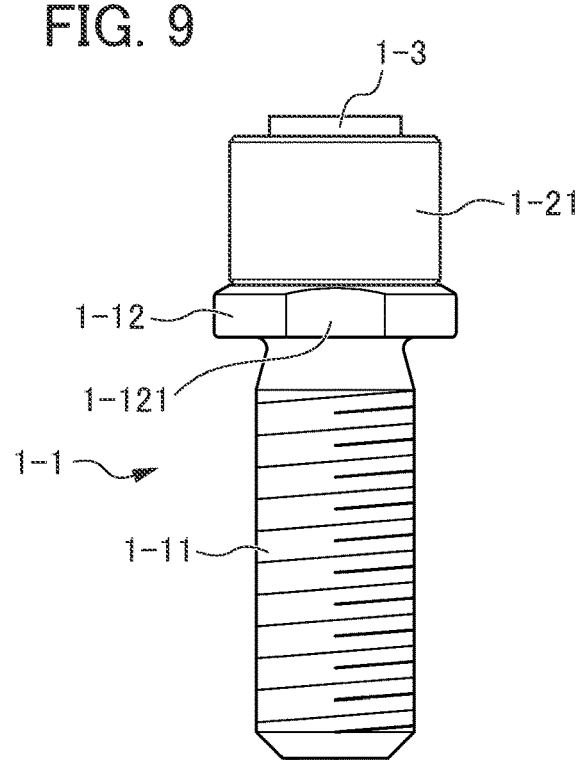
FIG. 9 is a cross-sectional front view showing an intermediate process of the manufacturing method for the RFID tag-equipped mounting member according to the third example of Embodiment 1-1 of the present invention.
Figure 10:
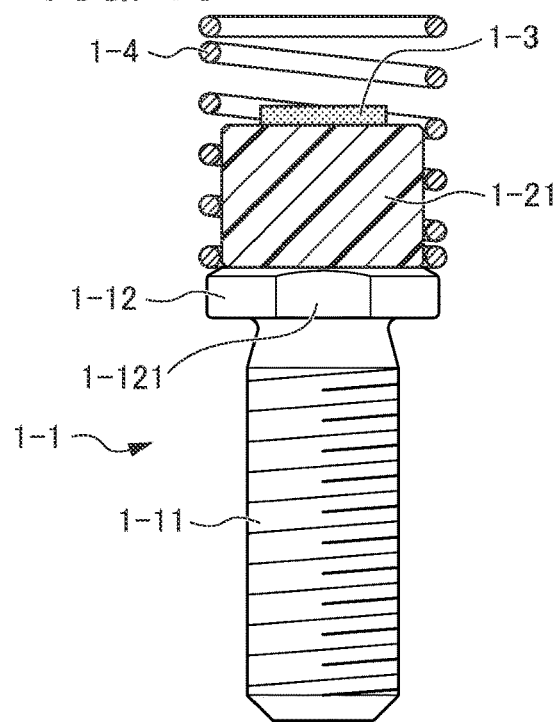
FIG. 10 is a cross-sectional front view showing an intermediate process of the manufacturing method for the RFID tag-equipped mounting member according to the third example of Embodiment 1-1 of the present invention.
Figure 11:
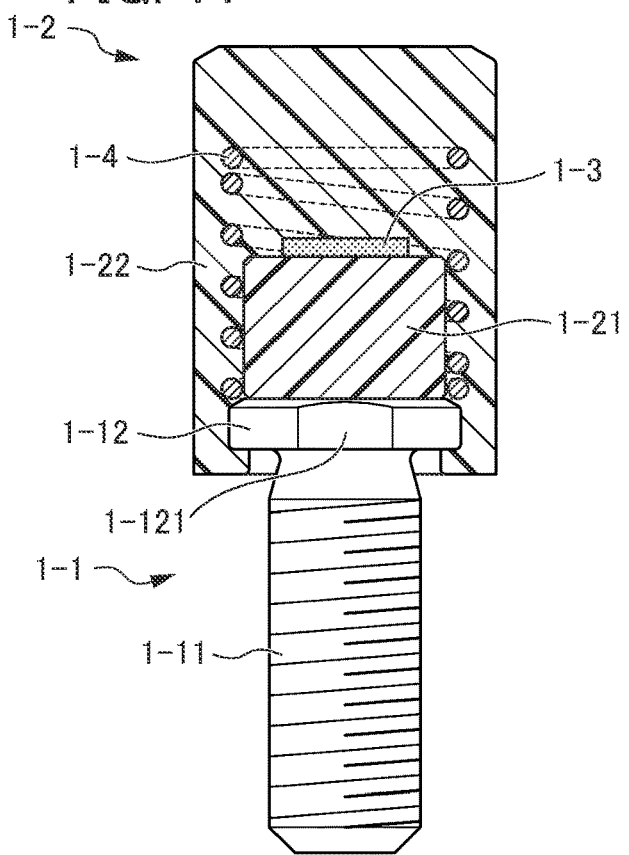
FIG. 11 is a cross-sectional front view showing a final process of the manufacturing method for the RFID tag-equipped mounting member according to the third example of Embodiment 1-1 of the present invention.

Next, a manufacturing method for a RFID tag-equipped bolt according to a third example of Embodiment 1-1 will be described with reference to FIGS. 8 to 11 which show an initial process, an intermediate process, a final process, respectively. FIG. 8 is a cross-sectional front view showing an initial process of the manufacturing method for the RFID tag-equipped mounting member according to the third example of Embodiment 1-1 of the present invention. FIG. 9 is a cross-sectional front view showing an intermediate process of the manufacturing method for the RFID tag-equipped mounting member according to the third example of Embodiment 1-1 of the present invention. FIG. 10 is a cross-sectional front view showing an intermediate process of the manufacturing method for the RFID tag-equipped mounting member according to the third example of Embodiment 1-1 of the present invention. FIG. 11 is a cross-sectional front view showing a final process of the manufacturing method for the RFID tag-equipped mounting member according to the third example of Embodiment 1-1 of the present invention.

As shown in FIG. 8, a RFID tag-equipped bolt according to the third example of Embodiment 1-1 is configured in which an upper surface of a base portion 1-12 of a shaft-shaped unit 1-1 is formed to be flat and a pedestal 1-21 is formed in a rectangular parallelepiped shape. The pedestal 1-21 may be formed in a cubic shape. In any case, a top surface of the pedestal 1-21 does not have a middle lower portion. A width of the pedestal 1-21 is smaller than an outer shape of a base portion 12, in order words, the upper surface of the base portion 1-12 protrudes from the pedestal 1-21. A boost antenna 1-4 is formed in a coil spring shape as in the first example.

As shown in FIG. 9, in the intermediate process of manufacturing the RFID tag-equipped bolt according to the third example of Embodiment 1-1, the pedestal 1-21 is fixed to the base portion 1-12 of the shaft-shaped unit 1-1 with an adhesive, for example. An RFID tag 1-3 is fixed to the top surface of the pedestal 1-21 with an adhesive, for example. Although not shown, even in the RFID tag-equipped bolt according to the third example of Embodiment 1-1, a middle lower portion may be formed on the upper surface of the pedestal 1-21 and the RFID tag may be embedded in the middle lower portion.

As shown in FIG. 10, in the intermediate process of manufacturing the RFID tag-equipped bolt according to the third example of Embodiment 1-1, the boost antenna 1-4 is further set on the base portion 1-12 so as to surround the pedestal 1-21. The boost antenna 1-4 include a base end fixed to the pedestal 1-21, and an intermediate part surrounding the RFID tag 1-3, and a tip side extending longer than the top surface of the pedestal 1-21.

As shown in FIG. 11, in the final process of manufacturing the RFID tag-equipped bolt according to the third example of Embodiment 1-1, the pedestal 1-21 mounted with the RFID tag 1-3 and the base portion 1-12 are molded with resin to form a cap 1-22. In other words, in the final process, the head unit 1-2 is formed by molding the pedestal 1-21 with the cap 1-22. When the head unit 1-2 of the RFID tag-equipped bolt is rotated in the circumferential direction, the shaft-shaped unit 1-1 is rotated integrally without idling.

Figure 12:
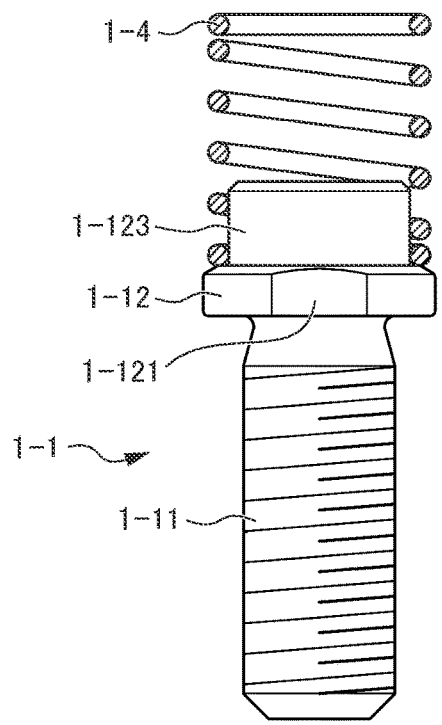
FIG. 12 is a cross-sectional front view showing an initial process of a manufacturing method for the RFID tag-equipped mounting member according to a fourth example of Embodiment 1-1 of the present invention.
Figure 13:
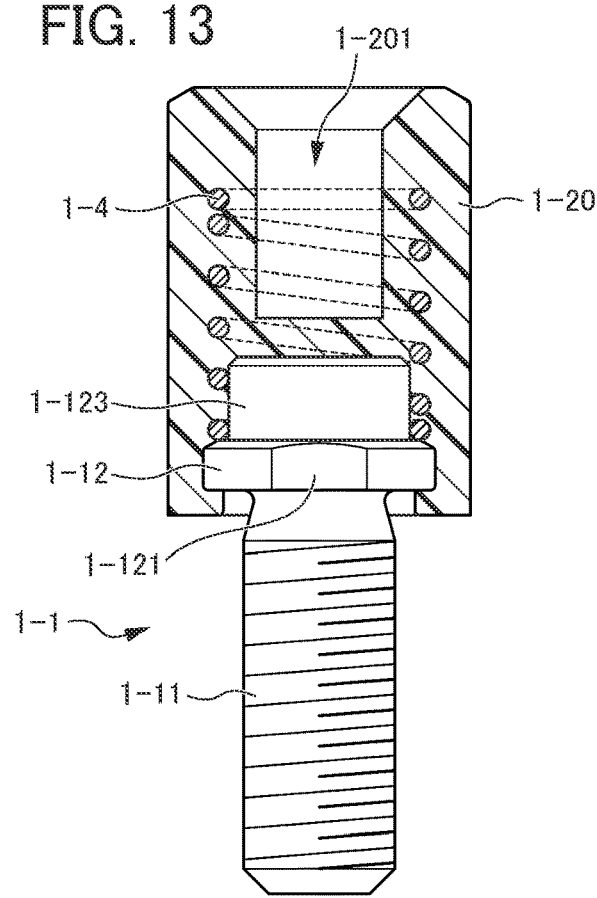
FIG. 13 is a cross-sectional front view showing an intermediate process of the manufacturing method for the RFID tag-equipped mounting member according to the fourth example of Embodiment 1-1 of the present invention.
Figure 14:
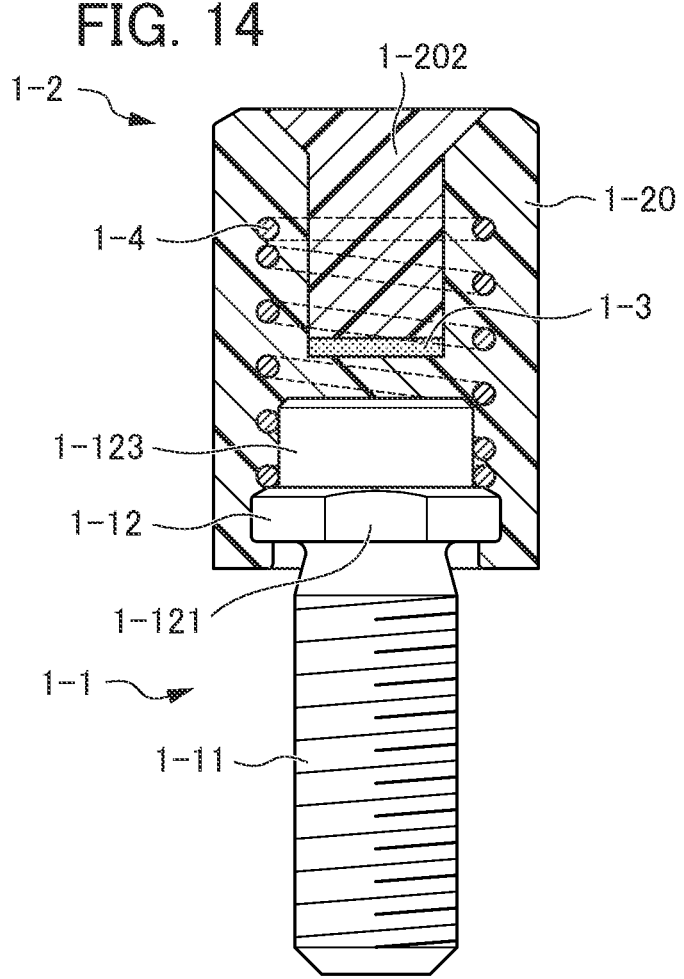
FIG. 14 is a cross-sectional front view showing a final process of the manufacturing method for the RFID tag-equipped mounting member according to the fourth example of Embodiment 1-1 of the present invention.

Next, a manufacturing method for a RFID tag-equipped bolt according to a fourth example of Embodiment 1-1 will be described with reference to FIGS. 12 to 14 which show an initial process, an intermediate process, a final process, respectively. FIG. 12 is a cross-sectional front view showing an initial process of the manufacturing method for the RFID tag-equipped mounting member according to the fourth example of Embodiment 1-1 of the present invention. FIG. 13 is a cross-sectional front view showing an intermediate process of the manufacturing method for the RFID tag-equipped mounting member according to the fourth example of Embodiment 1-1 of the present invention. FIG. 14 is a cross-sectional front view showing a final process of the manufacturing method for the RFID tag-equipped mounting member according to the fourth example of Embodiment 1-1 of the present invention.

As shown in FIG. 12, in the initial process of the manufacturing method according to the fourth example of Embodiment 1-1, a protrusion portion 1-123 is formed at a center of an upper surface of the base portion 1-12. In the initial process, a boost antenna 1-4 is further set on the base portion 1-12 such that a half of a base end side of the boost antenna 1-4 surrounds the protrusion portion 1-123 of the base portion 1-12.

As shown in FIG. 13, in the intermediate process of the manufacturing method according to the fourth example of Embodiment 1-1, the base portion 1-12 of the shaft-shaped unit 1-1 is set in a cavity of a mold, and an original form 1-20 of a head unit having the pedestal 1-21 is molded with molten resin. A vertical hole 1-201 is formed at a top of the original form 1-20 of the head unit. Therefore, the mold used in the intermediate process of the manufacturing method according to the fourth example of Embodiment 1-1 includes a first core for forming the vertical hole 1-201. However, the vertical hole 1-201 may be formed by a drill, for example. In any case, in the intermediate process, the original form 1-20 of the head unit seals the boost antenna 1-4 set on the pedestal 1-21 with molten resin.

As shown in FIG. 14, in the final process of the manufacturing method according to the fourth example of Embodiment 1-1, an RFID tag 1-3 is mounted on a deep side of the vertical hole 201 of the original form 20 of the head unit. Subsequently, using a second core of the mold, molten resin is injected into the vertical hole of the original form 1-20 of the head unit on which the RFID tag 1-3 is mounted. Therefore, the mold used in the final process of the third manufacturing method includes the second core for forming the vertical hole 1-201. The molten resin 1-202 solidifies to be integrated with the original form 1-20 of the head unit, and the head unit 1-2 is finally completed.

A resin plug fitted into the vertical hole 1-201 may be manufactured separately without injecting the molten resin into the vertical hole 1-201 using the second core. The resin plug is fixed with an adhesive so as to maintain a state of being fitted into the vertical hole of the original form 1-20 of the head unit on which the RFID tag 1-3 is mounted. Since the plug cannot be turned or twisted, it is fixed to the original form 1-20 of the head unit so as not to come out of the vertical hole 1-201.

Figure 15:
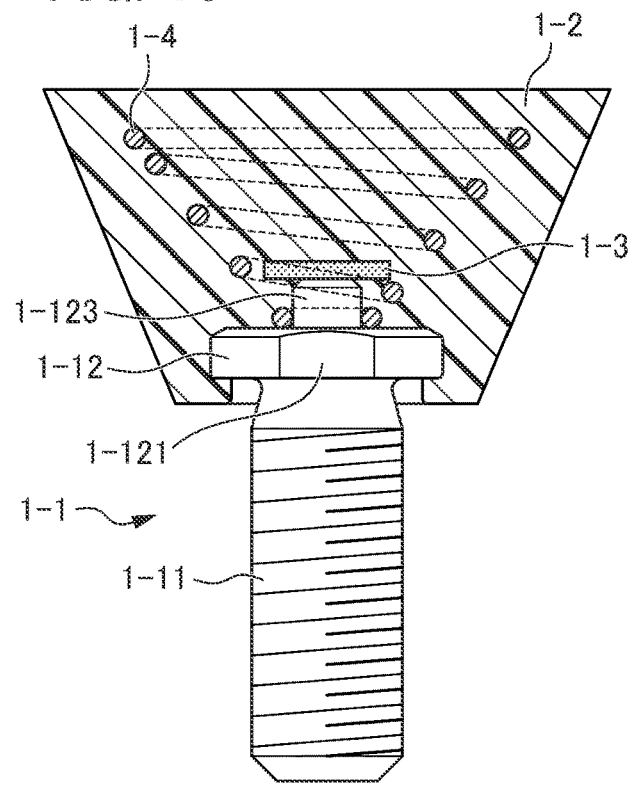
FIG. 15 is a cross-sectional front view showing an RFID tag-equipped mounting member according to a fifth example of Embodiment 1-1 of the present invention.

Next, an RFID tag-equipped mounting member according to a fifth example of Embodiment 1-1 will be described with reference to FIG. 15. FIG. 15 is a cross-sectional front view showing an RFID tag-equipped mounting member according to a fifth example of Embodiment 1-1 of the present invention.

Similarly to those according to the first to fourth examples of Embodiment 1-1, the RFID tag-equipped mounting member according to the fifth example of Embodiment 1-1 includes a shaft-shaped unit 1-1, a head unit 1-2, an RFID tag 1-3, and a boost antenna 1-4. However, as shown in FIG. 15, the boost antenna 1-4 according to the fifth example of Embodiment 1-1 is formed in a conical coil spring shape. The boost antenna 1-4 according to the fifth example of Embodiment 1-1 has a base end side, which is installed on a base portion 1-12 and is reduced in diameter, and a tip side which is enlarged in diameter. Therefore, the head unit 1-2 according to a first example of Embodiment 1-2 has a truncated cone shape in which the base portion 1-12 is reduced in diameter and the tip side is enlarged in diameter. A protrusion portion 1-123 protrudes from an upper surface of the base portion 1-12. The RFID tag 1-3 is mounted on a top surface of the protrusion portion 1-123.

A cap 1-22 is formed by molding the base portion 1-12 and the protrusion portion 1-123 of the shaft-shaped unit 1-1 and the tag block (RFID tag 1-3 and boost antenna 1-4) with resin. Since the boost antenna 1-4 is formed in a cylindrical coil spring shape in which a tip side is enlarged in diameter, the cap 1-22 is formed in a truncated cone shape, in which a tip side is enlarged in diameter, along an outer periphery of the boost antenna 1-4. The cap 1-22 is insert-molded with a mold. The outer peripheral surface of the cap 1-22 may be formed with a flat-shaped knurl in the length direction.

The boost antenna 1-4 according to the fifth example of Embodiment 1-1 is disposed such that a reduced diameter side surrounds the RFID tag 1-3. In other words, since the side of the boost antenna 1-4 closer to the base portion 12 is reduced in diameter, the protrusion portion 1-123 is formed to be low. Depending on the shape of the boost antenna 1-4, adjustment suitable for desired sensitivity characteristics is performed.

Figure 16:
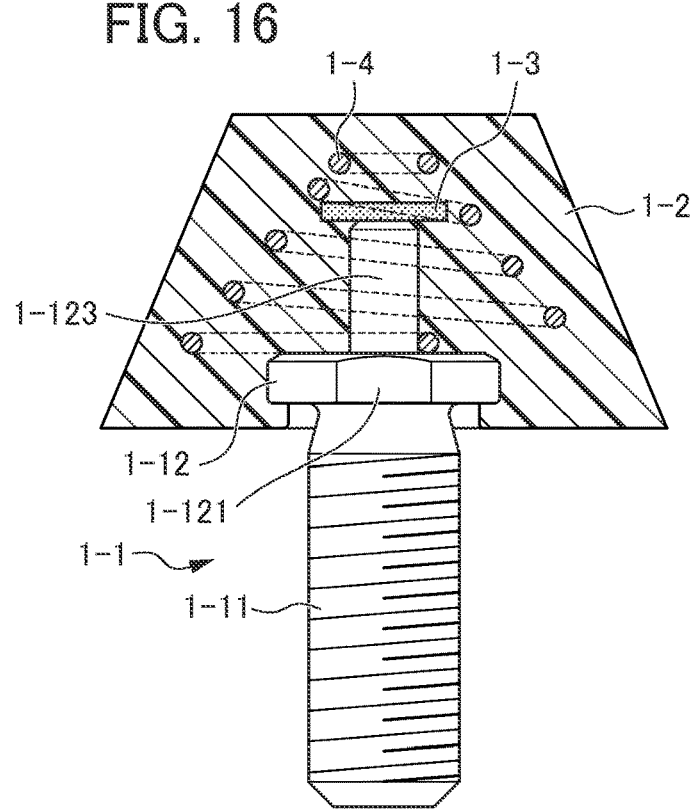
FIG. 16 is a cross-sectional front view showing an RFID tag-equipped mounting member according to a sixth example of Embodiment 1-1 of the present invention.

Next, an RFID tag-equipped mounting member according to a sixth example of Embodiment 1-1 will be described with reference to FIG. 16. FIG. 16 is a cross-sectional front view showing an RFID tag-equipped mounting member according to a sixth example of Embodiment 1-1 of the present invention.

As shown in FIG. 16, a boost antenna 1-4 according to the sixth example of Embodiment 1-1 has a base end side, which is installed on a base portion 1-12 and is enlarged in diameter, and a tip side which is reduced in diameter. An RFID tag 1-3 is mounted on a top surface of a protrusion portion 1-123 protruding from the base portion 1-12. The RFID tag 1-3 is disposed on the tip side with the reduced diameter of the boost antenna 1-4. In the sixth example of Embodiment 1-1, since the tip side of the boost antenna 1-4 is reduced in diameter, the protrusion portion 1-123 is formed to be high. Depending on the shape of the boost antenna 1-4, adjustment suitable for desired sensitivity characteristics is performed.

A cap 1-22 is molded in a truncated cone shape, in which a tip side is reduced in diameter, with resin for sealing the base portion 1-12 and the protrusion portion 1-123 of the shaft-shaped unit 1-1 and the tag block (RFID tag 1-3 and boost antenna 1-4) with resin. Since the boost antenna 1-4 is formed in a conical coil spring shape, the cap 1-22 is formed in a truncated cone shape along the outer periphery of the boost antenna 1-4. The cap 1-22 is insert-molded with a mold. The outer peripheral surface of the cap 1-22 may be formed with a flat-shaped knurl in the length direction.

Although not shown, in a seventh example of Embodiment 1-1, an RFID tag 1-3 is disposed on the base end side of the boost antenna 1-4 having the cylindrical coil spring shape shown in the first example. Therefore, a protrusion portion 1-123 of a base portion 1-12, on which the RFID tag 1-3 is mounted, is formed lower than the protrusion portion 1-123 shown in FIGS. 1 to 4. Alternatively, the vertical hole 1-201 as shown in FIGS. 13 and 14 is formed to be deep.

Although not shown, in an eighth example of Embodiment 1-1, an RFID tag 1-3 is disposed on the tip side of the boost antenna 1-4 having the cylindrical coil spring shape shown in the first example. Therefore, a protrusion portion 1-123 of a base portion 1-12, on which the RFID tag 1-3 is mounted, is formed higher than the protrusion portion 1-123 shown in FIGS. 1 to 4. Since the RFID tag 1-3 mounted on the protrusion portion 1-123 is away from the base portion 1-12 of the shaft-shaped unit 1-1, the RFID tag 1-3 is hardly affected by the base portion 1-12 of the shaft-shaped unit 1-1, and is improved in performance.

The RFID tag-equipped bolt (similarly, a RFID tag-equipped bolt of Embodiment 1-2 to be described below) of Embodiment 1-1 as described above is also used in various fields where data transmitted from a reader/writer is written in the RFID tag 1-3. For example, the RFID tag-equipped bolt is used in a mold management system. A mold managed in the mold management system (hereinafter, referred to as a "mold to be managed") may be stored for 15 years or longer after production of the product ended, for example.

Further, since the RFID tag-equipped bolt includes the boost antenna 1-4, even when the RFID tag 1-3 is a passive type that transmits and receives weak radio waves, the radio waves are boosted and the directivity in the radial direction is improved, whereby it is possible to reliably transmit and receive the radio waves to and from the reader/writer.

Embodiment 1-2

Figure 17A:
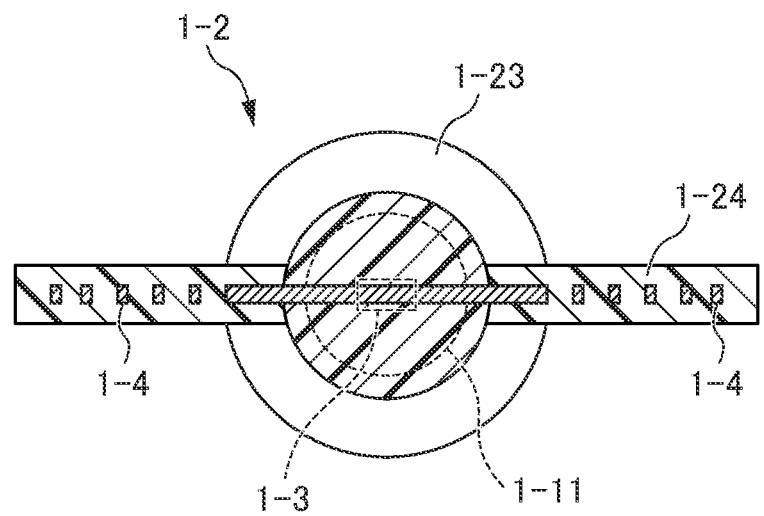
FIG. 17A is a partially cross-sectional plan view of an RFID tag-equipped mounting member according to a first example of Embodiment 1-2 of the present invention.
Figure 17B:
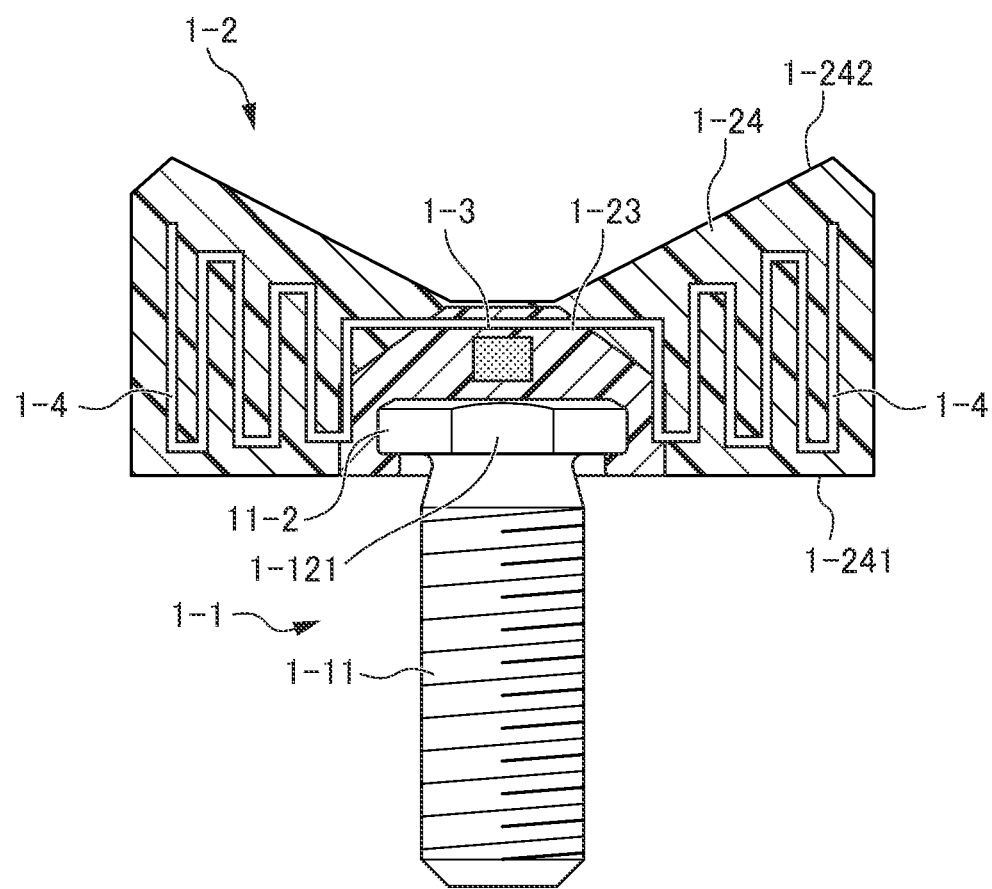
FIG. 17B is a cross-sectional front view showing the RFID tag-equipped mounting member according to the first example of Embodiment 1-2 of the present invention.

An RFID tag-equipped mounting member according to a first example of Embodiment 1-2 of the present invention will be described with reference to FIGS. 17A and 17B. FIG. 17A is a partially cross-sectional plan view of an RFID tag-equipped mounting member according to a first example of Embodiment 1-2 of the present invention. FIG. 17B is a cross-sectional front view showing the RFID tag-equipped mounting member according to the first example of Embodiment 1-2 of the present invention.

As shown in FIGS. 17A and 17B, the RFID tag-equipped mounting member according to the first example of Embodiment 1-2 includes a shaft-shaped unit 1-1, a head unit 1-2, an RFID tag 1-3, and a boost antenna 1-4 as in Embodiment 1-1. However, the RFID tag-equipped mounting member according to the first example of Embodiment 1-2 includes a head unit 1-2 having plate-shaped ribs 1-24 protruding in the radial direction of the insert portion 1-11.

The head unit 1-2 includes a modified columnar central portion 1-23 surrounding a base portion 1-12 and a pair of plate-shaped ribs 1-24. The central portion 1-23 has a shape in which a columnar part and a truncated cone part are integrally formed in an axial direction. Each of the pair of ribs 1-24 protrudes in the radial direction from the central portion 1-23 like a thumbscrew. Each of the ribs 1-24 includes a bottom side part 1-241 orthogonal to the insert portion 1-11 in the axial direction and an inclined part 1-242 inclined to the insert portion 1-11 in the axial direction and protruding from the central portion 23.

The boost antenna 1-4 is patterned inside the head unit 1-2 like a meandering conductor pattern in accordance with the shape of the head unit 1-2 having a thumbscrew shape. The meandering conductor pattern is formed such that a width of the rib 1-24 is narrow on the base end side and gradually widens on the tip side when the length direction of the insert portion 1-11 is taken as a width direction. A base end of each of the meandering conductor pattern in each of the ribs 1-24 is disposed adjacent to the RFID tag. In other words, the boost antenna 1-4 is not electrically connected to the RFID tag 1-3. The boost antenna 1-4 with the meandering conductor pattern has both functions of a magnetic coupling type antenna and a capacitive coupling type antenna.

The boost antenna 1-4 shown in FIGS. 17A and 17B has the meandering conductor pattern that gradually widens on the tip side. However, the boost antenna 1-4 may have a meandering conductor pattern with the same width over the entire length. The ribs 1-24 in this case are formed in which a bottom and top sides are parallel.

Figure 18A:
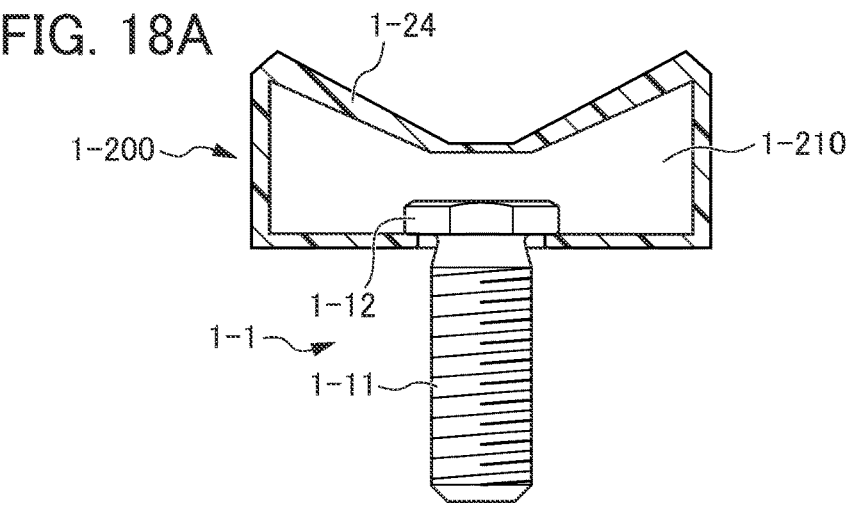
FIG. 18A is a cross-sectional front view showing an initial process of a first manufacturing method for the RFID tag-equipped mounting member according to the first example of Embodiment 1-2 of the present invention.
Figure 18B:
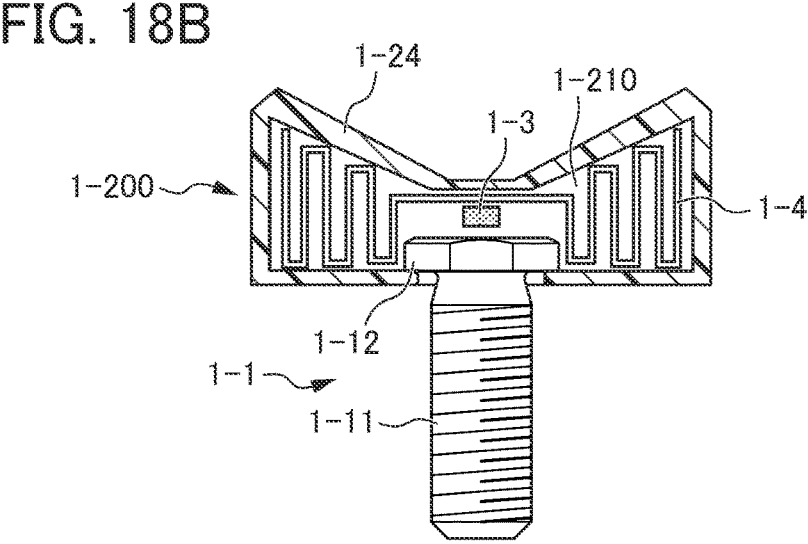
FIG. 18B is a cross-sectional front view showing an intermediate process of the first manufacturing method for the RFID tag-equipped mounting member according to the first example of Embodiment 1-2 of the present invention.
Figure 18C:
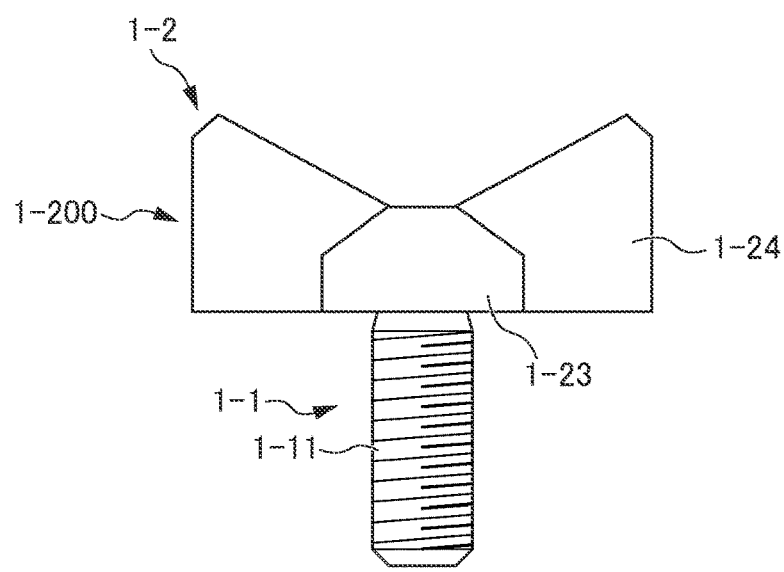
FIG. 18C is a cross-sectional front view showing a final process of the first manufacturing method for the RFID tag-equipped mounting member according to the first example of Embodiment 1-2 of the present invention.

Here, a manufacturing method for the RFID tag-equipped bolt according to the first example of Embodiment 1-2 will be described with reference to FIGS. 18A to 18C which show an initial process, an intermediate process, a final process, respectively. FIG. 18A is a cross-sectional front view showing an initial process of a first manufacturing method for the RFID tag-equipped mounting member according to the first example of Embodiment 1-2 of the present invention. FIG. 18B is a cross-sectional front view showing an intermediate process of the first manufacturing method for the RFID tag-equipped mounting member according to the first example of Embodiment 1-2 of the present invention. FIG. 18C is a cross-sectional front view showing a final process of the first manufacturing method for the RFID tag-equipped mounting member according to the first example of Embodiment 1-2 of the present invention.

Since the head unit 1-2 of the RFID tag-equipped bolt has a meander-shaped conductive pattern, it is molded in a recumbent posture by an in-molding mold. As shown in FIG. 18A, in the first manufacturing method of the RFID tag-equipped bolt according to the first example of Embodiment 1-2, a head unit 1-200 is formed by in-mold semi-molding, as one side half of the head unit 1-2 in a thickness direction.

An outer periphery of the head unit 1-200 as the half of the head unit 1-2 is fringed, and a flat recess 1-210 is formed inside the fringed outer periphery.

Next, as shown in FIG. 18B, the boost antenna 1-4 having a meandering conductor pattern and the RFID tag 1-3 are set in the recess 1-210 formed in one side half of the head unit 1-2. Since the outer periphery of a lower half of the head unit 1-2 is fringed, the boost antenna 1-4 does not misalign in the recess 1-210.

Next, as shown in FIG. 18C, the cavity is replaced with a different mold, molten resin is molded in the recess 1-210 in which the boost antenna 1-4 and the RFID tag 1-3 are set, and the head unit 1-2 is molded by molding the other half. The RFID tag-equipped bolt having such a head unit 1-2 can be tightened or loosened by turning the rib 1-24, whereby usability is improved in addition to sensitivity.

Figure 19A:
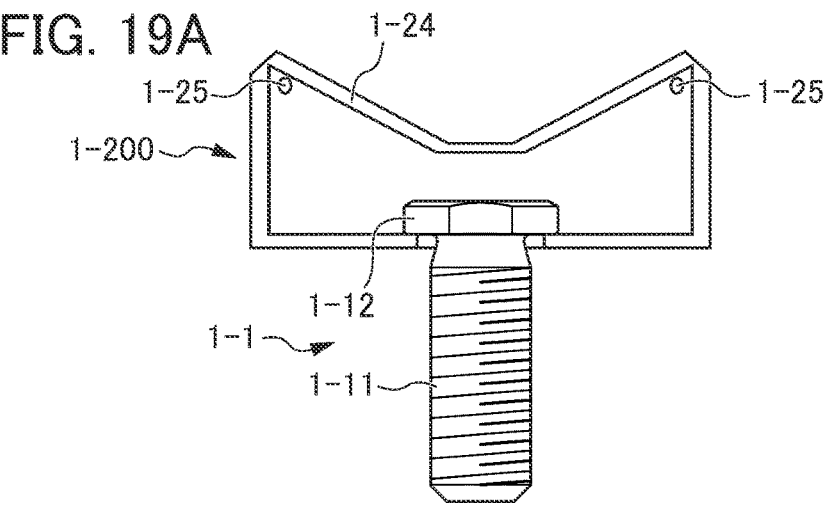
FIG. 19A is a front view showing an initial process of a second manufacturing method for the RFID tag-equipped mounting member according to the first example of Embodiment 1-2 of the present invention.
Figure 19B:
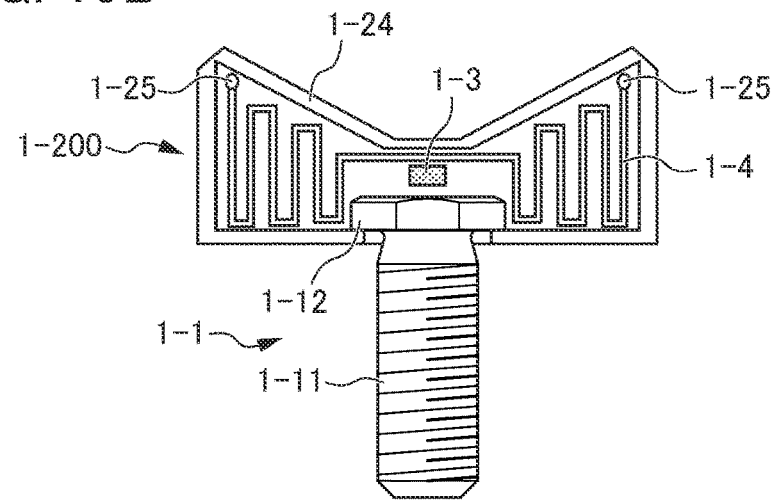
FIG. 19B is a front view showing an intermediate process of a manufacturing method 1-2 for the RFID tag-equipped mounting member according to the first example of Embodiment 1-2 of the present invention.
Figure 19C:
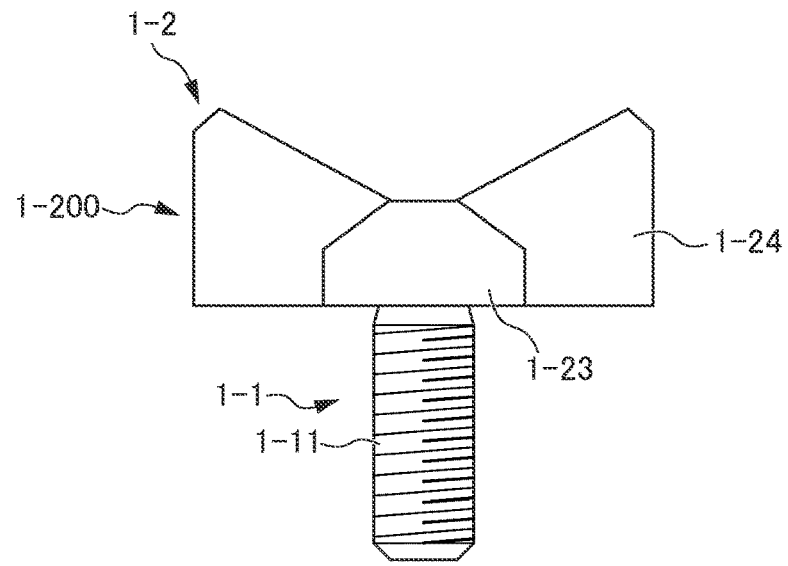
FIG. 19C is a cross-sectional front view showing a final process of the second manufacturing method for the RFID tag-equipped mounting member according to the first example of Embodiment 1-2 of the present invention.

Here, a manufacturing method for the RFID tag-equipped bolt according to the first example of Embodiment 1-2 will be described with reference to FIGS. 19A to 19C which show an initial process, an intermediate process, a final process, respectively. FIG. 19A is a front view showing an initial process of a second manufacturing method for the RFID tag-equipped mounting member according to the first example of Embodiment 1-2 of the present invention. FIG. 19B is a front view showing an intermediate process of a manufacturing method 1-2 for the RFID tag-equipped mounting member according to the first example of Embodiment 1-2 of the present invention. FIG. 19C is a cross-sectional front view showing a final process of a second manufacturing method for the RFID tag-equipped mounting member according to the first example of Embodiment 1-2 of the present invention.

In the second manufacturing method for the RFID tag-equipped bolt according to the first example of Embodiment 1-2, an inlay is used in which the boost antenna 1-4 with the meandering conductor pattern and the RFID tag 1-3 are attached to a base material packing material (web) such as a seal.

As shown in FIG. 19A, in the initial process of the second manufacturing method for the RFID tag-equipped bolt according to the first example of Embodiment 1-2, a head unit 1-200 is formed by in-mold semi-molding, as one side half of the head unit 1-200, which has a positioning boss 1-25 for positioning the inlay, in a thickness direction.

Next, in the intermediate process as shown in FIG. 19B, a web is set on the half of the head unit 1-2 formed by the in-mold semi-molding. The web is set at a predetermined position by the positioning boss 1-25.

Next, in the final process as shown in FIG. 19C, a cavity of the mold is replaced, and the other side half of the head unit 1-2 is molded, whereby a head unit 1-2 having a predetermined shape is provided.

Figure 20A:
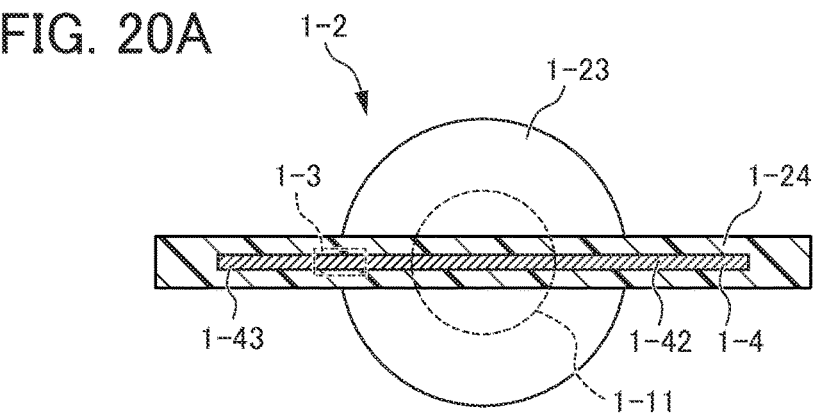
FIG. 20A is a cross-sectional plan view taken along line A-A in FIG. 20C showing a final process for an RFID tag-equipped mounting member according to a second example of Embodiment 1-2 of the present invention.
Figure 20B:
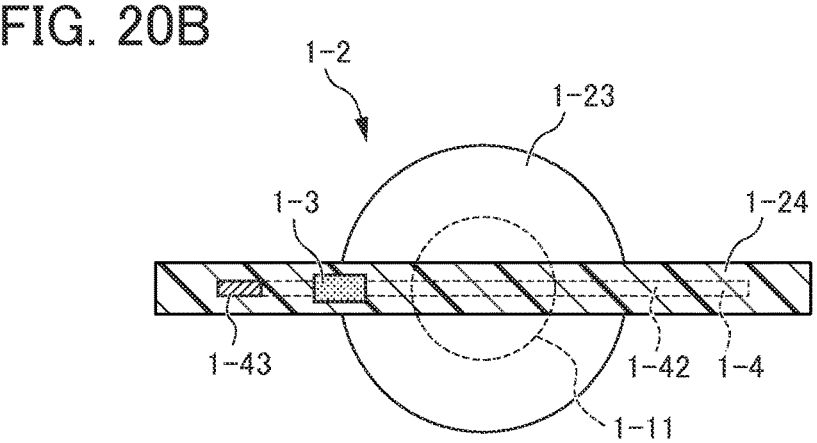
FIG. 20B is a cross-sectional view taken along line B-B in FIG. 20C showing the final process for the RFID tag-equipped mounting member according to the second example of Embodiment 1-2 of the present invention.
Figure 20C:
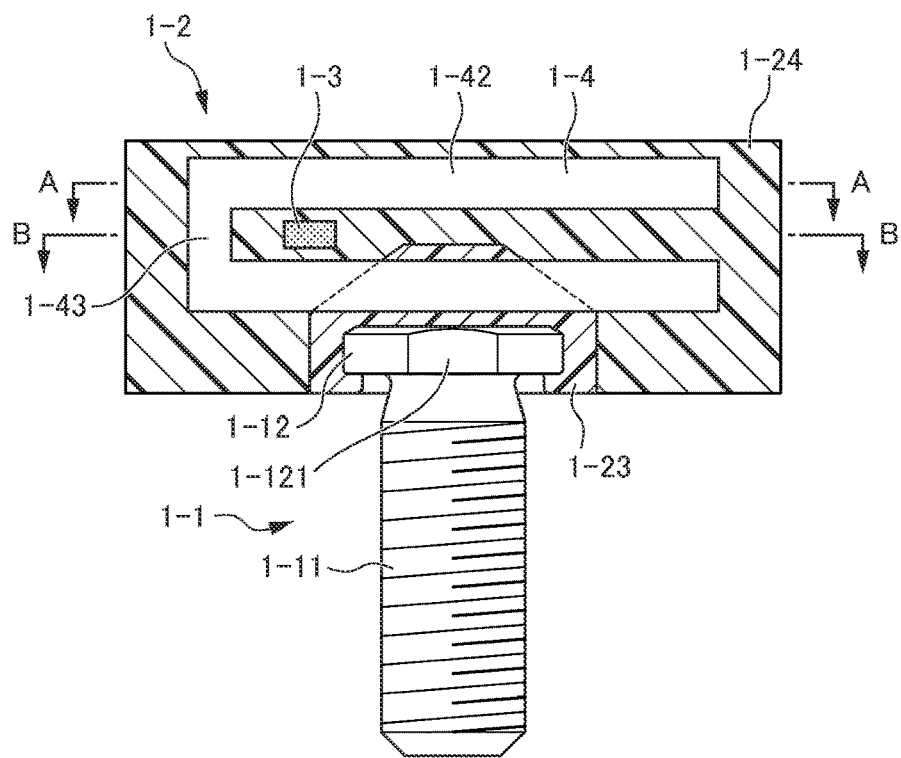
FIG. 20C is a second cross-sectional front view showing the final process for the RFID tag-equipped mounting member according to the second example of Embodiment 1-2 of the present invention.

Next, an RFID tag-equipped mounting member according to a second example of Embodiment 1-2 of the present invention will be described with reference to FIGS. 20A to 20C. FIG. 20A is a cross-sectional plan view taken along line A-A in FIG. 20C showing a final process for the RFID tag-equipped mounting member according to the second example of Embodiment 1-2 of the present invention. FIG. 20B is a cross-sectional view taken along line B-B in FIG. 20C showing the final process for the RFID tag-equipped mounting member according to the second example of Embodiment 1-2 of the present invention. FIG. 20C is a second cross-sectional front view showing the final process for the RFID tag-equipped mounting member according to the second example of Embodiment 1-2 of the present invention.

As shown in FIGS. 20A to 20C, the RFID tag-equipped mounting member according to the second example of Embodiment 1-2 includes a shaft-shaped unit 1-1, a head unit 1-2, an RFID tag 1-3, and a boost antenna 1-4 as in Embodiment 1-1. However, the RFID tag-equipped mounting member according to the second example of Embodiment 1-2 includes a rectangular plate-shaped head unit 1-2 protruding in the radial direction of the insert portion 1-11.

The head unit 1-2 according to the second example of Embodiment 1-2 includes a modified columnar central portion 1-23 surrounding a base portion 1-12 and a rectangular plate-shaped ribs 1-24. The central portion 1-23 has a shape in which a columnar part and a truncated cone part are integrally formed in an axial direction. A bottom side and a top side of the rib 1-24 are formed in parallel.

The boost antenna 1-4 according to the second example of Embodiment 1-2 has a U-shape when viewed from the front, and includes two parallel stick-shaped portions 1-42 and a folded portion 1-43 that connect one end sides of both the stick-shaped portions 1-42 to each other. In the boost antenna 1-4, the central portion 1-23 of the stick-shaped portions 1-42 on the shaft-shaped unit 1-1 is fixed to the truncated cone part of the head unit 1-2. The boost antenna 1-4 with the U-shaped conductor pattern has both functions of a magnetic coupling type antenna and a capacitive coupling type antenna.

The RFID tag 1-3 is sandwiched between the two stick-shaped portions 1-42 so as to be located within the rib 1-24. The RFID tag 1-3 shown in FIGS. 20A to 20C is disposed adjacent to the folded portion 1-43 of the boost antenna 1-4, but may be disposed at a tip side. The RFID tag 1-3 is disposed in one rib 1-24 rather than in the center of the head unit 1-2. Alternatively, although not shown, the RFID tag 1-3 may be disposed within the head unit 1-2 rather than within the rib 1-24. In other words, a position where the RFID tag 1-3 is disposed is not limited.

Although not shown, the RFID tag-equipped mounting member according to the second example of Embodiment 1-2 may have the RFID tag 1-3 formed in a zigzag (winding) pattern in which a plurality of stick-shaped portions 1-42 are disposed in parallel, that is, a horizontal meandering pattern. In this case, the RFID tag 1-3 is sandwiched between any adjacent stick-shaped portions 1-42. Further, the rib 1-24 for molding the zigzag-shaped boost antenna 1-4 is formed higher than the rib 1-24 for molding the U-shaped boost antenna 1-4.

The RFID tag-equipped mounting member according to the second example of Embodiment 1-2 is manufactured in the same manner as the RFID tag-equipped mounting member according to the first example of Embodiment 1-2.

Figure 21A:
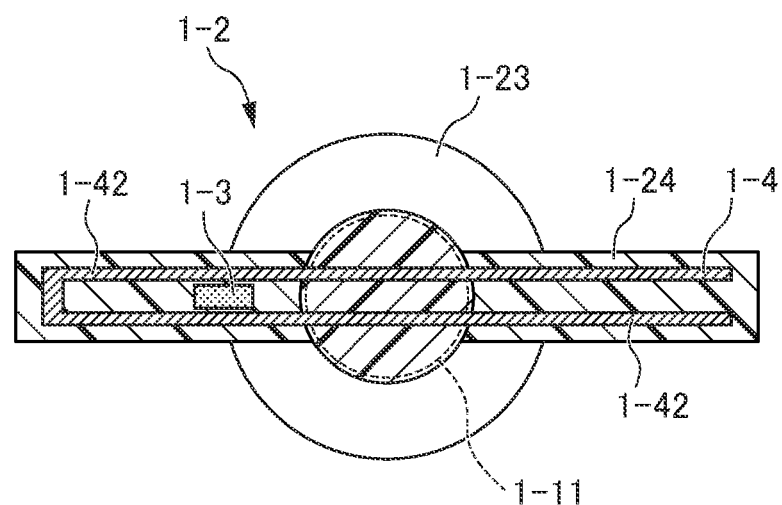
FIG. 21A is a partially cross-sectional plan view showing a final process of an RFID tag-equipped mounting member according to a third example of Embodiment 1-2 of the present invention.
Figure 21B:
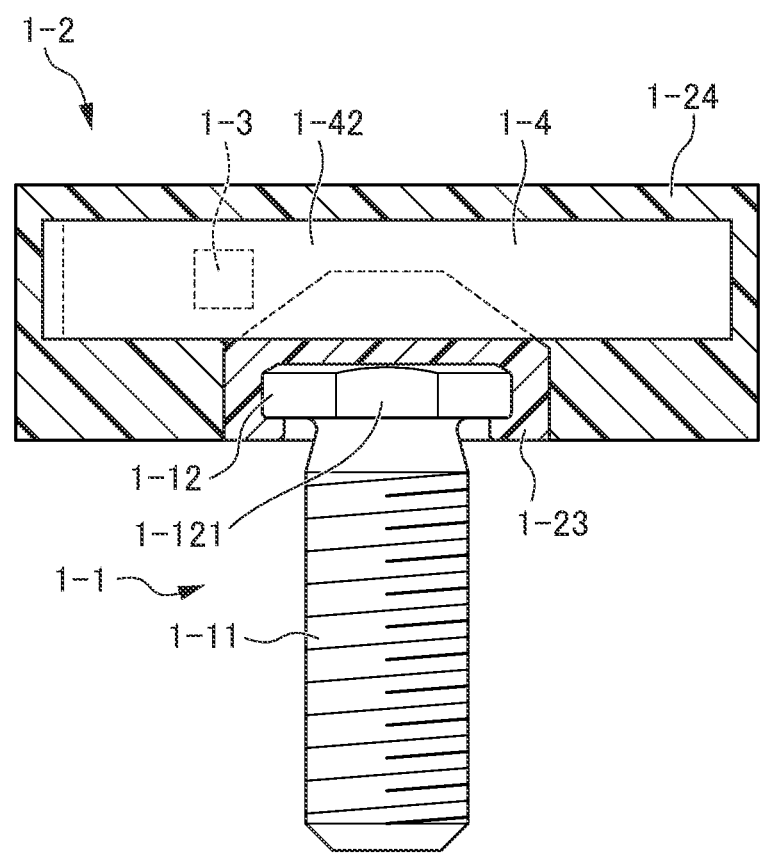
FIG. 21B is a cross-sectional front view showing the final process of the RFID tag-equipped mounting member according to the third example of Embodiment 1-2 of the present invention.

Next, an RFID tag-equipped mounting member according to a third example of Embodiment 1-2 of the present invention will be described with reference to FIGS. 21A and 21B. FIG. 21A is a partially cross-sectional plan view showing a final process of an RFID tag-equipped mounting member according to a third example of Embodiment 1-2 of the present invention. FIG. 21B is a cross-sectional front view showing the final process of the RFID tag-equipped mounting member according to the third example of Embodiment 1-2 of the present invention.

As shown in FIG. 21, the RFID tag-equipped mounting member according to the third example of Embodiment 1-2 includes a shaft-shaped unit 1-1, a head unit 1-2, and RFID tag 1-3, and a boost antenna 1-4 as in the Embodiment 1-1. However, the RFID tag-equipped mounting member according to the second example of Embodiment 1-2 includes a rectangular plate-shaped head unit 1-2 protruding in the radial direction of the insert portion 1-11.

The head unit 1-2 according to the third example of Embodiment 1-2 includes a modified columnar central portion 1-23 surrounding a base portion 1-12 and a rectangular plate-shaped ribs 1-24. The central portion 1-23 has a shape in which a columnar part and a truncated cone part are integrally formed in an axial direction. A bottom side and a top side of the rib 1-24 are formed in parallel. However, the rib 1-24 according to the third example is formed thicker than the rib 1-24 according to the second example.

The boost antenna 1-4 according to the third example of Embodiment 1-2 is a member that is folded in two such that sides of stick-shaped portions 1-42 face each other. The stick-shaped portion 1-42 is rectangular with long and short sides, with a fold on the short side, and is disposed within one end of the rib 1-24. Tips of the stick-shaped portions 1-42 facing the boost antenna 1-4 are disposed within the other end of the rib 1-24. The boost antenna 1-4 with the twice-folded conductor pattern has both functions of a magnetic coupling type antenna and a capacitive coupling type antenna. When the fold of the twice-folded boost antenna 1-4 is provided on the long side, a communication distance is significantly reduced.

The RFID tag 1-3 is sandwiched between both the stick-shaped portions 1-42, which are twice-folded members, of the boost antenna 1-4. The RFID tag 1-3 shown in FIG. 21 is disposed near the central portion 1-23 of the boost antenna 1-4. However, the RFID tag 1-3 may be disposed near the folded portion 1-43. In any case, the RFID tag 1-3 is disposed in the rib 1-24 rather than in the center of the head unit 1-2.

The RFID tag-equipped mounting member according to the third example of Embodiment 1-2 is manufactured in the same manner as the RFID tag-equipped mounting member according to the first example of Embodiment 1-2.

In the RFID tag 1-3 according to the first to third examples of Embodiment 1-2, since the boost antenna 1-4 has the stick shape, as the distance from the RFID tag 1-3 increases, a radiation surface widens when the boost antenna 1-4 expands, and the radiation surface is concentrated when the boost antenna 1-4 narrows, whereby the communication distance extends. Further, as the shape of the boost antenna 1-4 changes, it is possible to change a sense of size of the head unit 1-2.

Other Embodiments of First Embodiment

The RFID tag-equipped bolt according to the embodiment of the present invention is not limited to the contents described above, and includes modifications and improvements within the scope of achieving the object of the present invention.

For example, in the above-described embodiment, the insert portion 1-11 is the shaft-shaped male screw. However, the insert portion 1-11 may be a pin without a male screw, and the pin is not limited to be columnar, and may be prismatic.

In the above-described embodiment, the base portion 1-12 is formed in the disc shape. However, the base portion 1-12 may be polygonal. In the above-described embodiment, the outer peripheral surface of the base portion 1-12 is formed with the chamfered portion 1-121, and the head unit 1-2 includes the locking portion that joins with the chamfered portion 1-121. However, the outer peripheral surface of the base portion 1-12 may be formed with a knurl without being formed with the chamfered portion 1-121, and the inner surface of the head unit 1-2 may enter the knurl. Further, when the base portion 1-12 and the head unit 1-2 are fixed and integrated, the base portion 1-12 may not be formed with the chamfered portion 1-121, and the head unit 1-2 may not include the locking portion.

In the above-described embodiment, the insert portion 1-11 and the base portion 1-12 are made of metal. However, either or both of the insert portion 1-11 and the base portion 1-12 may be formed with resin.

In the above-described embodiment, the case has been described in which the RFID tag-equipped bolt is used to manage the mold to be managed. However, the RFID tag-equipped bolt can also be used in a logistics field, a railway field, and a food industry, for example. In the logistics field, the RFID tag-equipped bolt is screwed into bodies of trucks and containers to manage the distribution of products. In the railway field, slackness of the bolt is managed. Such a bolt used in this case may have a larger size than a case of being screwed into the mold to be managed. In the food industry, the RFID tag-equipped bolt may be attached to plates at conveyor belt sushi restaurants to manage the elapsed time of sushi placed on the plates or to directly deliver sushi to customers who have ordered individually.

Embodiment 2-1

Figure 23:
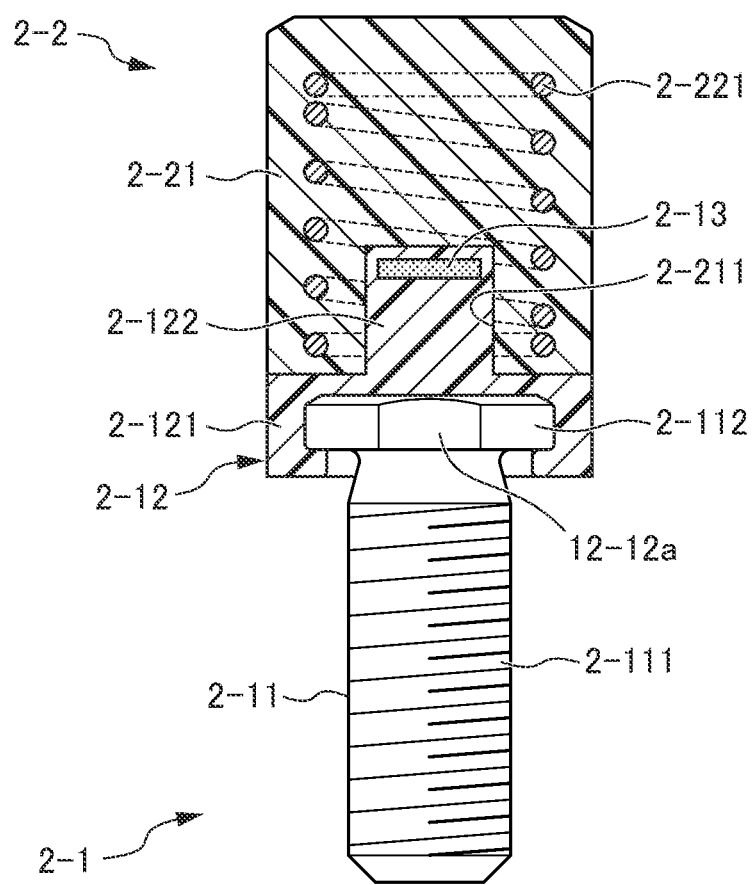
FIG. 23 is a cross-sectional front view showing the RFID tag-equipped mounting member according to the first example of Embodiment 2-1 of the present invention.

An RFID tag-equipped mounting member according to a first example of Embodiment 2-1 of the present invention will be described with reference to FIGS. 22 and 23. FIG. 22 is a cross-sectional front view showing a head unit and an RFID tag mount unit of the RFID tag-equipped mounting member according to the first example of Embodiment 2-1 of the present invention. FIG. 23 is a cross-sectional front view showing the RFID tag-equipped mounting member according to the first example of Embodiment 2-1 of the present invention.

The RFID tag-equipped mounting member includes not only fastening members such as bolts and screws that are screwed with female screws and nuts, but also pins, for example that are inserted into shaft holes. However, in Embodiment 2-1 (the same applies to Embodiments 2-2 to 2-4 to be described below), since a mounting member such as a bolt is an example of as the RFID tag-equipped mounting member, an "RFID tag-equipped bolt" will be mainly described below. As shown in FIG. 22, the RFID tag-equipped bolt includes an RFID (Radio Frequency Identification) tag mount unit 2-1 and a head unit 2-2.

The RFID tag mount unit 2-1 includes a shaft-shaped unit 2-11, a pedestal 2-12, and an RFID tag 2-13. The shaft-shaped unit 2-11 includes an insert portion 2-111 and a base portion 2-112. The insert portion 2-111 and the base portion 2-112 are made of metal such as aluminum or stainless steel. The insert portion 2-111 is formed with a male screw in a shaft shape. However, a male screw is not formed in the vicinity of one end (a portion continuous with the base portion 2-112) of the insert portion 2-111.

The base portion 2-112 is provided at one end of the insert portion 2-111 so as to protrude in a cross-sectional direction. A cross-sectional direction is a direction orthogonal to a length direction of the insert portion 2-111. The cross-sectional direction in the insert portion 2-111 formed with the male screw can be called a radial direction or a width direction. The base portion 2-112 is formed in a disc shape. A center of the disc-shaped base portion 2-112 coincides with a center in the cross-sectional direction of the insert portion 2-111. A flat chamfered portion 2-112a is formed on a part of an outer peripheral surface of the base portion 2-112.

The pedestal 2-12 is insert-molded with resin on an upper surface side (an upper side in the drawing) of the base portion 2-112 where the insert portion 2-111 is not present. As shown in FIG. 22, the pedestal 2-12 includes an expansion portion 2-121 and a protrusion portion 2-122.

The expansion portion 2-121 is formed in a round tray shape having an annular part surrounding the outer periphery of the base portion 2-112. The expansion portion 2-121 is insert-molded into the base portion 2-112 and integrated with the base portion 2-112 without being separated. An arcuate locking portion (not shown) is formed in a part of an inner surface of the expansion portion 2-121 so as to engage with the chamfered portion 2-112a of the base portion 2-112. The protrusion portion 2-122 protrudes from the center of the upper surface of the base portion 2-112 in a columnar or a polygonal columnar shape in a direction opposite to the insert portion 2-111. Since the protrusion portion 2-122 is formed in the polygonal columnar shape or the arcuate locking portion is provided on the columnar protrusion portion 2-122, the protrusion portion 2-122 can be prevented from idling in rotation with respect to the head unit 2-2.

An encapsulating portion 2-122a is formed on a top end of the protrusion portion 2-122 to embed the RFID tag 2-13. The RFID tag 2-13 is embedded and protected in the top end of the insert-molded protrusion portion 2-122. However, the RFID tag 2-13 may be fixed to the top end surface of the protrusion portion 2-122 with an adhesive, for example without being embedded in the encapsulating portion 2-122a such that the RFID tag 2-13 is exposed. Alternatively, a dented middle lower portion may be formed on the top end surface of the protrusion portion 2-122, and the RFID tag 2-13 may be embedded in the middle lower portion. Further, the RFID tag 2-13 embedded in the middle lower portion may be fixed with an adhesive, for example.

In any case, the RFID tag 2-13 is a passive tag. In other words, the RFID tag 2-13 does not embed a battery, and is driven by receiving radio waves from a reader/writer (not shown) and using the radio waves as power source. The RFID tag 2-13 is an ultra-compact (for example, a length, a width, and a thickness being 2.5 mm, 2.5 mm, and 0.375 mm, respectively) chip-shaped electronic component in which an IC chip for recording information and an antenna used for wireless communication are combined.

The head unit 2-2 according to the first example of Embodiment 2-1 includes a cap 2-21 that covers the protrusion portion 2-122 of the pedestal 2-12, and a boost antenna 2-221 that is embedded in the cap 2-21. The head unit 2-2 is molded with resin separately from that used for the pedestal 2-12 and is detachably attached.

The head unit 2-2 protrudes toward the upper surface of the base portion 2-112, and is provided to have the same outer diameter as the expansion portion 2-121 of the pedestal 2-12. The cap 2-21 is insert-molded into the head unit 2-2 using a mold. The cap 2-21 is formed in a one-end closed tube shape having a thick closed part on one end side (an upper side in the drawing). The cap 2-21 having the one-end closed tube shape is formed a one-end closed cylindrical shape or a one-end closed square tube shape (the same applies to the following embodiments). Although not shown, the outer peripheral surface of the cap 2-21 may be formed with a flat-shaped knurl in the length direction.

In the head unit 2-2, a recessed fitting portion 2-211, into which the protrusion portion 2-122 of the pedestal 2-12 is inserted, is formed at the center of the base end side (a lower side in the drawing) of the cap 2-21. The recessed fitting portion 2-211 is formed in a shape into which the protrusion portion 2-122 is inserted. In other words, when the protrusion portion 2-122 has a square tube shape, the recessed fitting portion 2-211 is formed in a square hole shape. When the protrusion portion 2-122 has a columnar shape, the recessed fitting portion 2-211 is formed in a cylindrical shape. The cap 2-21 embeds the boost antenna 2-221 having a coil spring shape. A base end side of the boost antenna 2-221 is disposed between the recessed fitting portion 2-211 and an outer surface.

The boost antenna 2-221 boosts radio waves transmitted and received by the RFID tag 2-13. The boost antenna 2-221 is formed in a cylindrical coil spring shape with a conductor wire containing metal, for example. As shown in FIG. 23, the protrusion portion 2-122 is preferably at least half the length of the boost antenna 2-221. A base end of the boost antenna 2-22 is fixed to the upper surface of the expansion portion 2-121, a half of the base end side surrounds the protrusion portion 2-122, and a half of the tip side extends from the top surface of the protrusion portion 2-122. The RFID tag 2-13 is disposed in an intermediate part in the length direction of the boost antenna 2-221. The boost antenna 2-221 is not electrically connected to the RFID tag 2-13. The boost antenna 2-221 is magnetically coupled to the antenna contained in the RFID tag 2-13.

Figure 24:
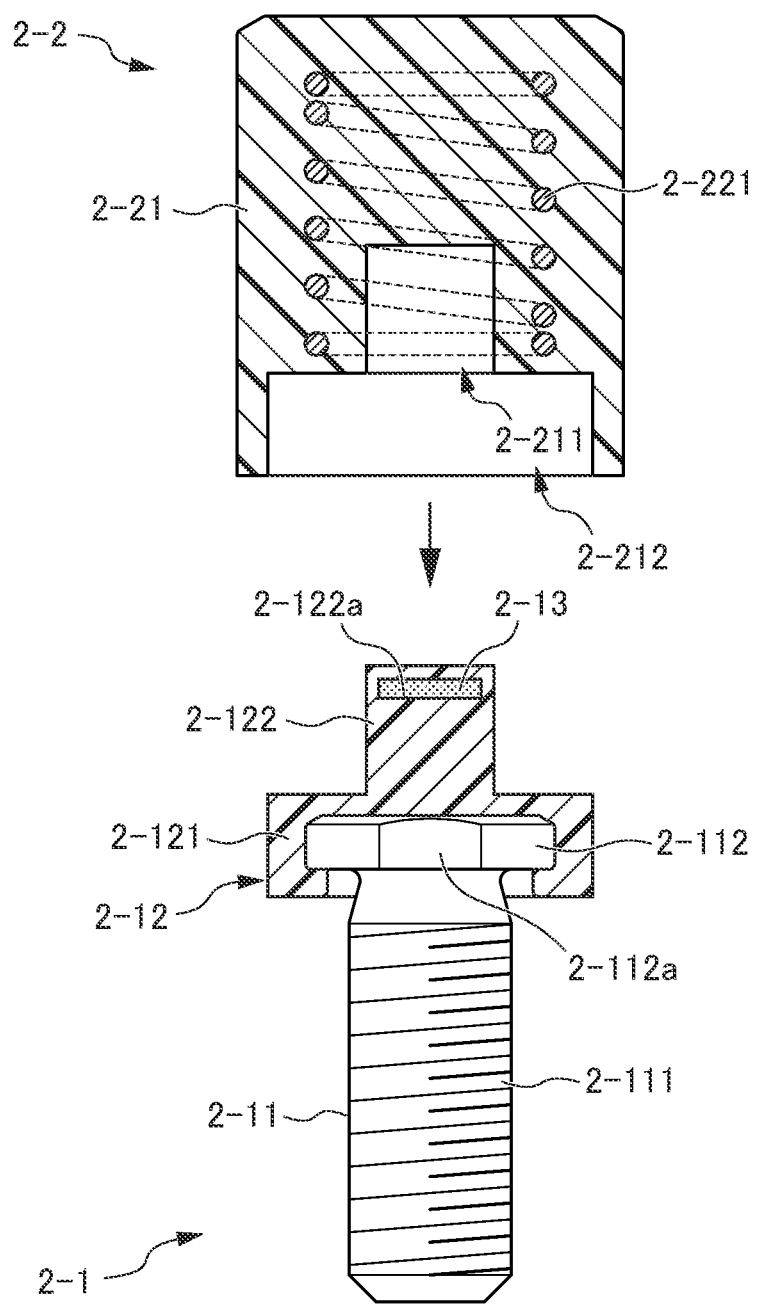
FIG. 24 is a cross-sectional front view showing a head unit of an RFID tag-equipped mounting member and an RFID tag mount unit according to a second example of Embodiment 2-1 of the present invention.
Figure 25:
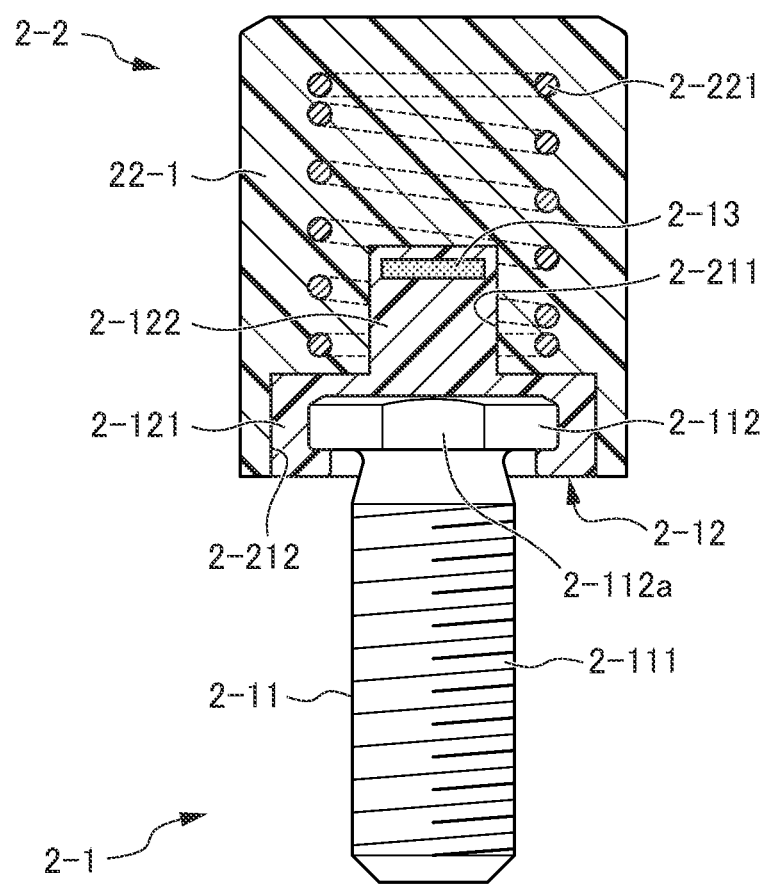
FIG. 25 is a cross-sectional front view showing the RFID tag-equipped mounting member according to the first example of Embodiment 2-1 of the present invention.

Next, an RFID tag-equipped bolt according to a second example of Embodiment 2-1 will be described with reference to FIGS. 24 and 25. FIG. 24 is a cross-sectional front view showing a head unit and an RFID tag mount unit of an RFID tag-equipped mounting member according to the second example of Embodiment 2-1 of the present invention. FIG. 25 is a cross-sectional front view showing the RFID tag-equipped mounting member according to the second example of Embodiment 2-1 of the present invention.

The RFID tag mount unit 2-1 according to the second example of Embodiment 2-1 includes a shaft-shaped unit 2-11, a pedestal 2-12, and an RFID tag 2-13 as in the first example of Embodiment 2-1.

A cap 2-21 according to the second example of Embodiment 2-1 is formed in a one-end closed tube shape having an outer diameter larger than that of an expansion portion 2-121 of the pedestal 2-12. In other words, a base end of the cap 2-21 fits externally into the expansion portion 2-121. Therefore, the cap 2-21 is formed with a stepped hole 2-212, into which the expansion portion 2-121 is fitted, on a base end side of a recessed fitting portion 2-211 into which a protrusion portion 2-122 is inserted.

Although not shown, the RFID tag-equipped bolt of Embodiment 2-1 includes various types of examples in addition to the first and second examples. For example, a type is included in which the protrusion portion of the pedestal 2-12 is higher or lower than that in the first and second examples, and thus the RFID tag 2-13 is disposed on the tip side or the base end side of the boost antenna 2-221. Further, the boost antenna 2-221 may have a conical coil spring shape in which the tip side or the base end side is reduced in diameter and the base end side or the tip side is enlarged in diameter, instead of the cylindrical shape. The cap 2-21 in this case has a truncated cone shape to match the shape of the boost antenna 2-221.

The head unit 2-2 with the boost antenna 2-221 of Embodiment 2-1 is appropriately selected from various types according to the sensitivity of the RFID tag 2-13, and is detachably attached to the pedestal 2-12. The pedestal 2-12 is exposed until being attached to the head unit 2-2. The RFID tag 2-13 embedded within the top end of the protrusion portion 2-122 of the pedestal 2-12 is hardly damaged. The protrusion portion 2-122 of the pedestal 2-12 is inserted into the recessed fitting portion 2-211 on the cap 2-21 attached to the pedestal 2-12. In the head unit 2 of the second example, the expansion portion 2-121 of the pedestal 2-12 is fitted into the stepped hole 2-212. When the head unit 2-2 is completely attached to the pedestal 2-12, the end surface on the base end side of the head unit 2-2 overlaps the upper surface of the expansion portion 2-121 of the pedestal 2-12.

The RFID tag-equipped bolt of Embodiment 2-1 is used in various fields where data transmitted from a reader/writer is written in the RFID tag 2-13. For example, the RFID tag-equipped bolt is used in a mold management system. A mold managed in the mold management system (hereinafter, referred to as a "mold to be managed") may be stored for 15 years or longer after production of the product ended, for example.

Further, since the RFID tag-equipped bolt includes the boost antenna 2-221, even when the RFID tag 2-13 is a passive type that transmits and receives weak radio waves, the radio waves are boosted and the directivity in the cross-sectional direction is improved, whereby it is possible to reliably transmit and receive the radio waves to and from the reader/writer.

Since the head unit 2-2 of the RFID tag-equipped bolt is replaceable, the optimum type of head unit 2-2 is selected according to attaching situations. For example, when it is desired to firmly attach the head unit 2-2 to the pedestal 2-12, the head unit 2-2 of the second example is selected in which not only the protrusion portion 2-122 is inserted into the recessed fitting portion 2-211, but also the base portion 2-112 is fitted into the stepped hole 2-212. Further, the head unit 2-2 of the first example is mounted to an RFID tag-equipped bolt attached in a narrow space, and the head unit 2-2 of the second example is mounted to an RFID tag-equipped bolt attached in a wide space.

Embodiment 2-2

Figure 26:
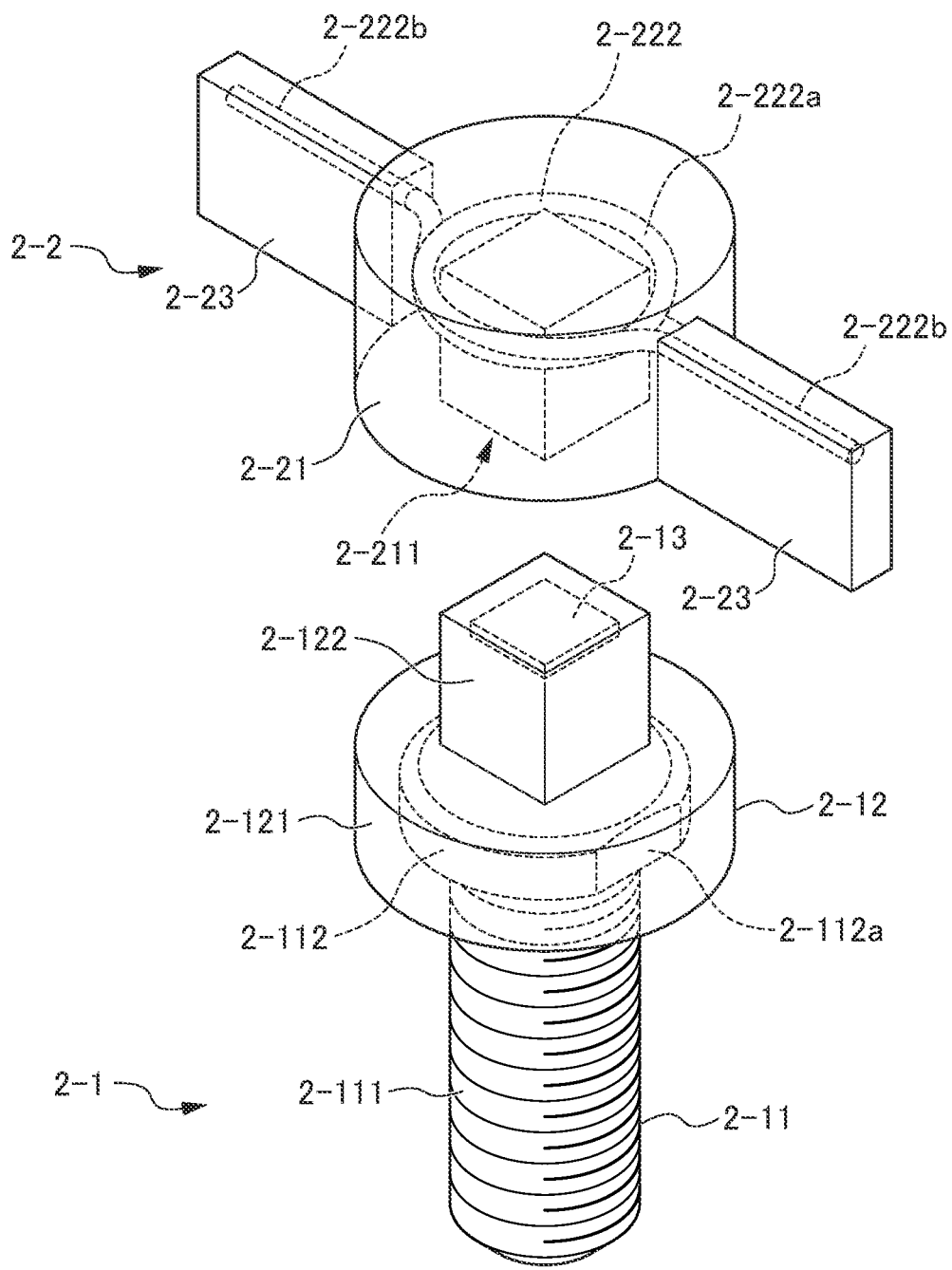
FIG. 26 is an exploded perspective view showing a head unit of an RFID tag-equipped mounting member and an RFID tag mount unit according to Embodiment 2-2 of the present invention.
Figure 27:
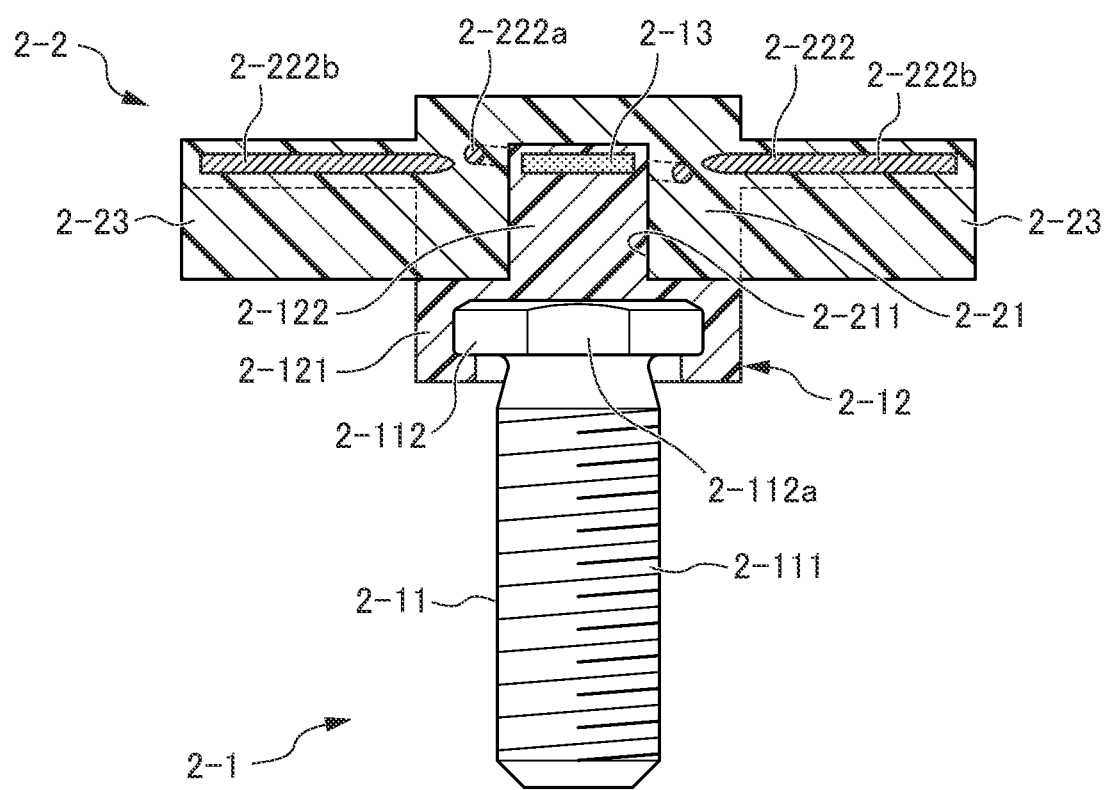
FIG. 27 is a cross-sectional front view showing the RFID tag-equipped mounting member according to Embodiment 2-2 of the present invention.

An RFID tag-equipped mounting member according to Embodiment 2-2 of the present invention will be described with reference to FIGS. 26 and 27. FIG. 26 is an exploded perspective view showing a head unit and an RFID tag mount unit of the RFID tag-equipped mounting member according to Embodiment 2-2 of the present invention. FIG. 27 is a cross-sectional front view showing the RFID tag-equipped mounting member according to Embodiment 2-2 of the present invention.

As shown in FIG. 26, the RFID tag-equipped bolt according to Embodiment 2-2 includes an RFID tag mount unit 2-1 and a head unit 2-2. The RFID tag mount unit 2-1 includes a shaft-shaped unit 2-11, a pedestal 2-12, and an RFID tag 2-13 as in Embodiment 2-1.

The head unit 2-2 includes a cap 2-21 covering main parts of the pedestal 2-12 with the RFID tag 2-13 mounted on a top surface thereof, and a boost antenna 2-222. The head unit 2-2 is molded separately from the pedestal 2-12 and is detachably attached thereto.

Unlike Embodiment 2-1, the head unit 2-2 of the RFID tag-equipped mounting member according to Embodiment 2-2 includes a cap 2-21 having a one-end closed tube shape and a pair of plate-shaped ribs 2-23 extending in opposite directions from side surfaces of the cap 2-21. Each of the ribs 2-23 protrudes in a cross-sectional direction (a radial direction in the drawing) with a width substantially equal to a length (a height in the drawing) in an axial direction of the cap 2-21. A finger makes contact with the rib 2-23 of the cap 2-21. Since the rib 2-23 is formed in a wide plate shape, it is less likely to break than when being formed in a shaft shape, and the head unit 2-2 can be easily turned while the finger is not caught. However, the rib 2-23 may be formed in a shaft shape. In the cap 2-21, a recessed fitting portion 2-211 having a square hole shape is formed into which a prismatic-shaped protrusion portion 2-122 of the pedestal 2-12 is inserted.

The RFID tag 2-13 is embedded in the top end of the protrusion portion 2-122. The RFID tag 2-13 is sandwiched between a deep inner surface of the recessed fitting portion 2-211 of the cap 2-21 and the top end surface of the protrusion portion 2-122. The protrusion portion 2-122 may be columnar, and the recessed fitting portion 2-211 may be cylindrical. In this case, a knurl is formed on a surface where the protrusion portion 2-122 and the recessed fitting portion 2-211 overlap, or a chamfered portion and a locking portion are formed for engagement.

The boost antenna 2-222 includes an element in which a loop portion 2-222a and a straight portion 2-222b are integrated. The loop portion 2-222a is embedded in the cap 2-21 so as to surround the tip side of the recessed fitting portion 2-211. The shown loop portion 2-222a is formed in an annular shape with only one and a half turns. In a head unit (not shown), the cap 2-21 embeds a loop portion 2-222a formed in an annular shape with two and a half turns or more.

Even in any boost antenna 2-222, each end of a diameter of the loop portion 2-222a is continuous with the straight portion 2-222b. Two straight portions 2-222b are formed in a shaft shape and are embedded in the ribs 2-23, respectively. When the rib 2-23 is formed in a plate shape, the straight portion 2-222b is disposed on one edge side (an upper end side in the drawing) of the rib 2-23. The two straight portions 2-222b and the RFID tag 2-13 are disposed linearly. Therefore, the loop portion 2-222a connected to the straight portion 2-222b has the same height position as a connection position with the straight portion 2-222b, and has an overall inclined ring shape.

The head unit 2-2 of Embodiment 2-2 includes various types of those in which the boost antenna 2-222 is embedded. The boost antenna 2-222 is formed in various shapes in which not only the number of winding turns of the loop portion 2-222a is different, but also the length of the straight portion 2-222b is different. The head unit 2-2 is appropriately selected according to radio waves to be transmitted to and received from the RFID tag 2-13, and is mounted on the pedestal 2-12. In other words, when the protrusion portion 2-122 of the pedestal 2-12 is inserted into the recessed fitting portion 2-211 of the cap 21, the pedestal 2-12 and the cap 2-21 are integrated to form the head unit 2-2. As shown in FIG. 27, the head unit 2-2 is in a state in which the RFID tag 2-13 mounted on the protrusion portion 2-122 of the pedestal 2-12 is surrounded by the loop portion 2-222a of the boost antenna 2-222.

Since the RFID tag-equipped bolt of Embodiment 2-2 includes the boost antenna 2-222 in which the loop portion 2-222a and the straight portion 2-222b are integrated, even when the RFID tag 2-13 is a passive type that transmits and receives weak radio waves, the radio waves are boosted and the directivity in the cross-sectional direction is improved, whereby it is possible to reliably transmit and receive the radio waves to and from the reader/writer.

Embodiment 2-3

Figure 28:
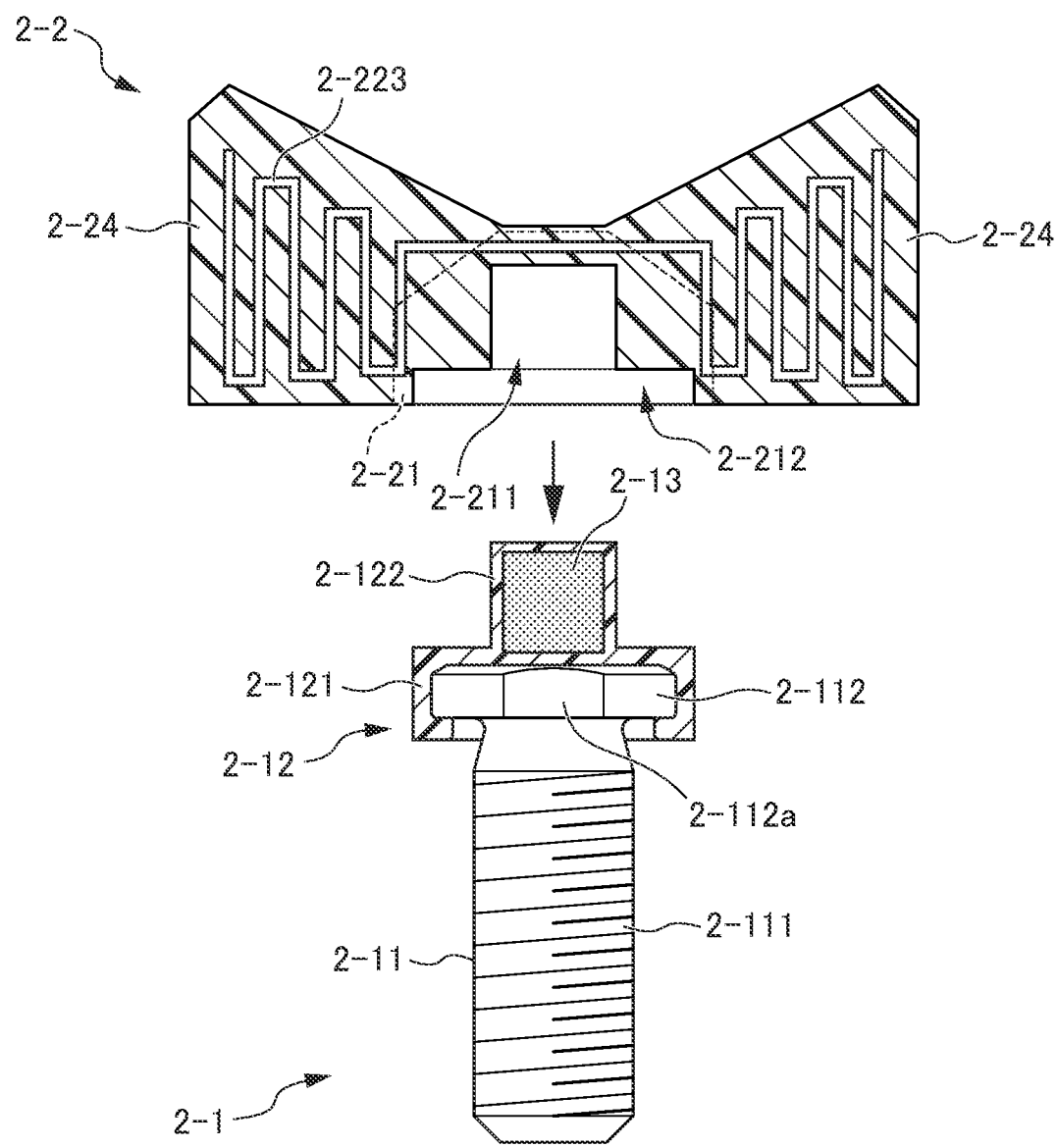
FIG. 28 is a cross-sectional front view showing a head unit of an RFID tag-equipped mounting member and an RFID tag mount unit according to a first example of Embodiment 2-3 of the present invention.
Figure 29:
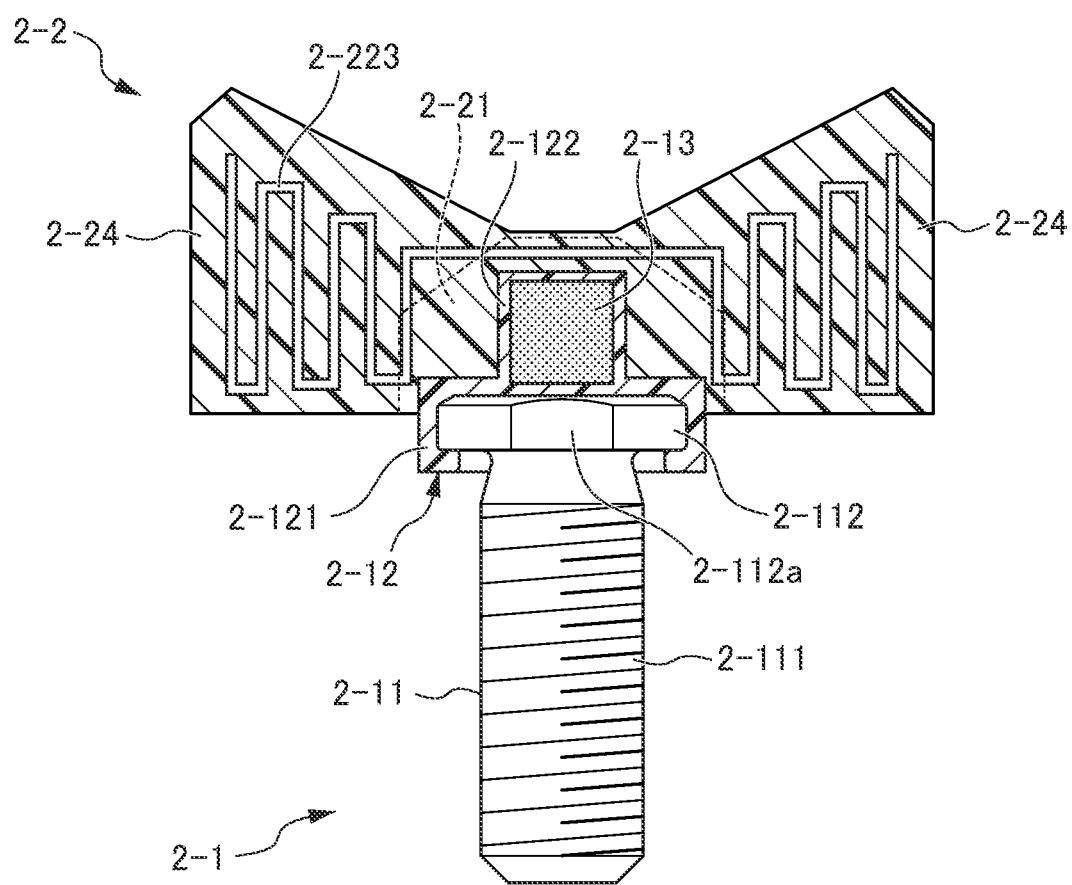
FIG. 29 is a cross-sectional front view showing the RFID tag-equipped mounting member according to the first example of Embodiment 2-3 of the present invention.
Figure 30:
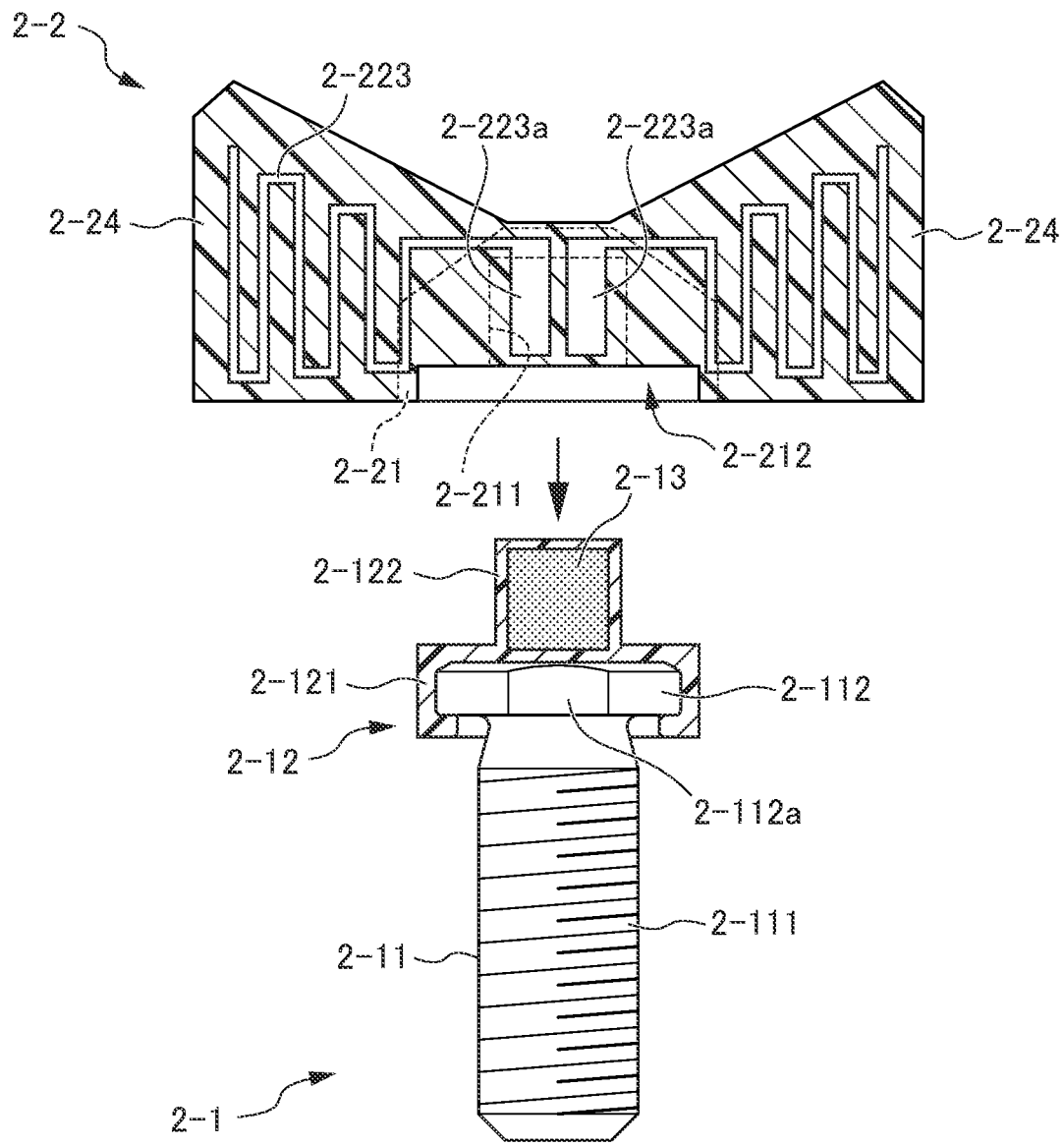
FIG. 30 is a cross-sectional front view showing a head unit of an RFID tag-equipped mounting member and an RFID tag mount unit according to a second example of Embodiment 2-3 of the present invention.
Figure 31:
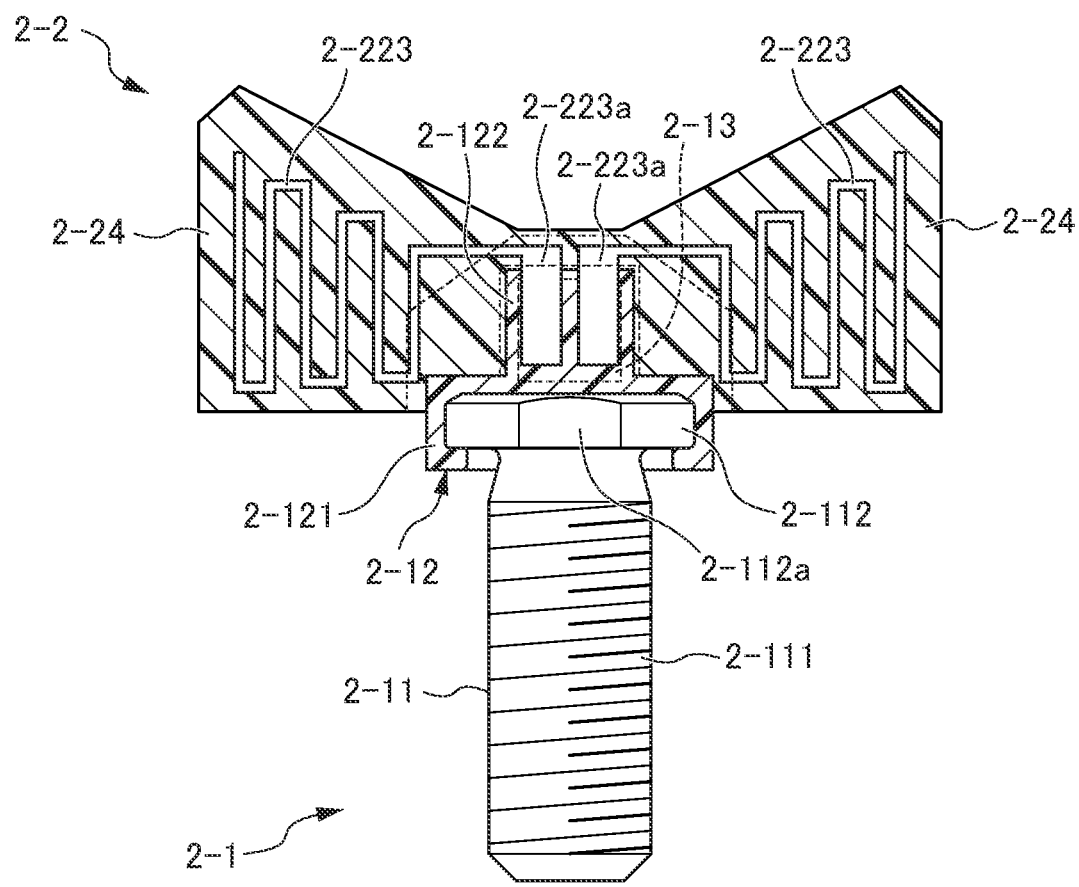
FIG. 31 is a cross-sectional front view showing the RFID tag-equipped mounting member according to the second example of Embodiment 2-3 of the present invention.

An RFID tag-equipped mounting member according to a first example of Embodiment 2-3 of the present invention will be described with reference to FIGS. 28 and 29, and an RFID tag-equipped mounting member according to a second example of Embodiment 2-3 of the present invention will be described with reference to FIGS. 30 and 31. FIG. 28 is a cross-sectional front view showing a head unit and an RFID tag mount unit of the RFID tag-equipped mounting member according to the first example of Embodiment 2-3 of the present invention. FIG. 29 is a cross-sectional front view showing the RFID tag-equipped mounting member according to the first example of Embodiment 2-3 of the present invention. FIG. 30 is a cross-sectional front view showing a head unit and an RFID tag mount unit of the RFID tag-equipped mounting member according to the second example of Embodiment 2-3 of the present invention. FIG. 31 is a cross-sectional front view showing the RFID tag-equipped mounting member according to the second example of Embodiment 2-3 of the present invention.

As shown in FIGS. 28 to 31, the RFID tag-equipped bolt according to the first and second examples of Embodiment 2-3 includes an RFID tag mount unit 2-1 and a head unit 2-2. The RFID tag mount unit 2-1 includes a shaft-shaped unit 2-11, a pedestal 2-12, and an RFID tag 2-13 as in Embodiment 2-1.

The pedestal 2-12 includes an expansion portion 2-121 and a protrusion portion 2-122. The expansion portion 2-121 surrounds a base portion 2-112 of the shaft-shaped unit 2-11. The protrusion portion 2-122 protrude from the base portion 2-112 in a plate shape. The RFID tag 2-13 is fixed to one surface (here, referred to as an "upper surface") of the protrusion portion 2-122 with an adhesive. However, a dent portion (not shown) may be formed from the upper surface to a rear surface of the protrusion portion 2-122, and the RFID tag 2-13 may be fitted into the dent portion. In any case, a main surface of the RFID tag 2-13 faces in the cross-sectional direction, that is, the shown RFID tag 2-13 is in a rising state.

The head unit 2-2 includes a cap 2-21 covering main parts of the pedestal 2-12 of the RFID tag mount unit 2-1, a pair of ribs 2-24, and a boost antenna 2-223. The head unit 2-2 is molded separately from the pedestal 2-12 and is detachably attached thereto.

The cap 2-21 has a shape in which a columnar part and a truncated cone part are integrally molded in an axial direction. The columnar part of the cap 2-21 is formed with a recessed fitting portion 2-211, into which the protrusion portion 2-122 of the pedestal 2-12 is inserted, and a stepped hole 2-212. Each of the ribs 2-24 protrudes in the cross-sectional direction from the cap 2-21 like a thumbscrew. Each of the ribs 2-24 includes a bottom side part orthogonal to the insert portion 2-111 in the axial direction and an inclined part inclined to the insert portion 2-111 in the axial direction and protruding from a central lower part.

The boost antenna 2-223 is patterned in a meandering shape. The meandering boost antenna 2-223 is formed such that a width of the rib 2-24 is narrow on the base end side and gradually widens on the tip side when the length direction of the insert portion 2-111 is taken as a width direction. The boost antenna 2-223 is embedded in the rib 2-24.

As shown in FIG. 28, base ends of the meandering boost antennas 2-223 in the ribs 2-24 according to the first example of Embodiment 2-3, that is, parts located in the central portion of the cap 2-21 are connected to each other. As shown in FIG. 29, when the cap 2-21 is mounted on the pedestal 2-12, the boost antenna 2-223 faces the RFID tag 2-13 so as to be capacitively coupled.

As shown in FIG. 30, base ends of the meandering boost antennas 2-223 in the ribs 2-24 according to the second example of Embodiment 2-3 are spaced apart from each other. A wide pad electrode 2-223a is provided at each of the base ends of the boost antenna 2-223 located in the central portion of the cap 2-21. The pad electrode 2-223a is embedded in the rib 2-24 shown in FIG. 30. The recessed fitting portion 2-211 is formed eccentrically in the rib 2-24 in which the pad electrode 2-223a is embedded, that is, is formed on a front side or a back side of the pad electrode 2-223a (in the drawing, the back side being indicated by a dotted line). On the other hand, from the pedestal 2-12 of the RFID tag mount unit 2-1, the protrusion portion 2-122 protrudes that is eccentric from the center and is fitted into the recessed fitting portion 2-211 of the rib 2-24. The RFID tag 2-13 is in a rising state of facing in the cross-sectional direction.

Although not shown, the pad electrode 2-223a may be exposed inside the recessed fitting portion 2-211. In this case, when the rib 2-24 is mounted so as to fit externally the protrusion portion 2-122 of the pedestal 2-12, the protrusion portion 2-122 is interposed between the pad electrode 2-223a and the RFID tag 2-13. In any case, as shown in FIG. 31, when the cap 2-21 is mounted on the pedestal 2-12, the pad electrodes 2-223a of the boost antennas 2-223 face RFID tag 2-13 so as to be capacitively coupled.

The boost antenna 2-223 having any meandering conductor pattern has also both functions of a magnetic coupling type antenna and a capacitive coupling type antenna. Since the RFID tag-equipped bolt includes the boost antenna 2-223, even when the RFID tag 2-13 is a passive type that transmits and receives weak radio waves, the radio waves are boosted and the directivity in the cross-sectional direction is improved, whereby it is possible to reliably transmit and receive the radio waves to and from the reader/writer.

In the head unit 2-2 of Embodiment 2-3, the boost antenna 2-223 is patterned in various forms other than those in the first and second examples. For example, the boost antenna 2-223 may be formed in a meandering shape with the same width from the base end side to the tip side, and may also be pitched at various intervals. The meandering boost antenna 2-223 having the same width is formed such that the rib 2-24 has the same width over the entire length, that is, an upper edge and a lower edge are parallel.

The RFID tag-equipped bolt is appropriately selected according to the situation in which the head unit 2-2 provided with various types of boost antennas 2-223 is attached.

Embodiment 2-4

Figure 32:
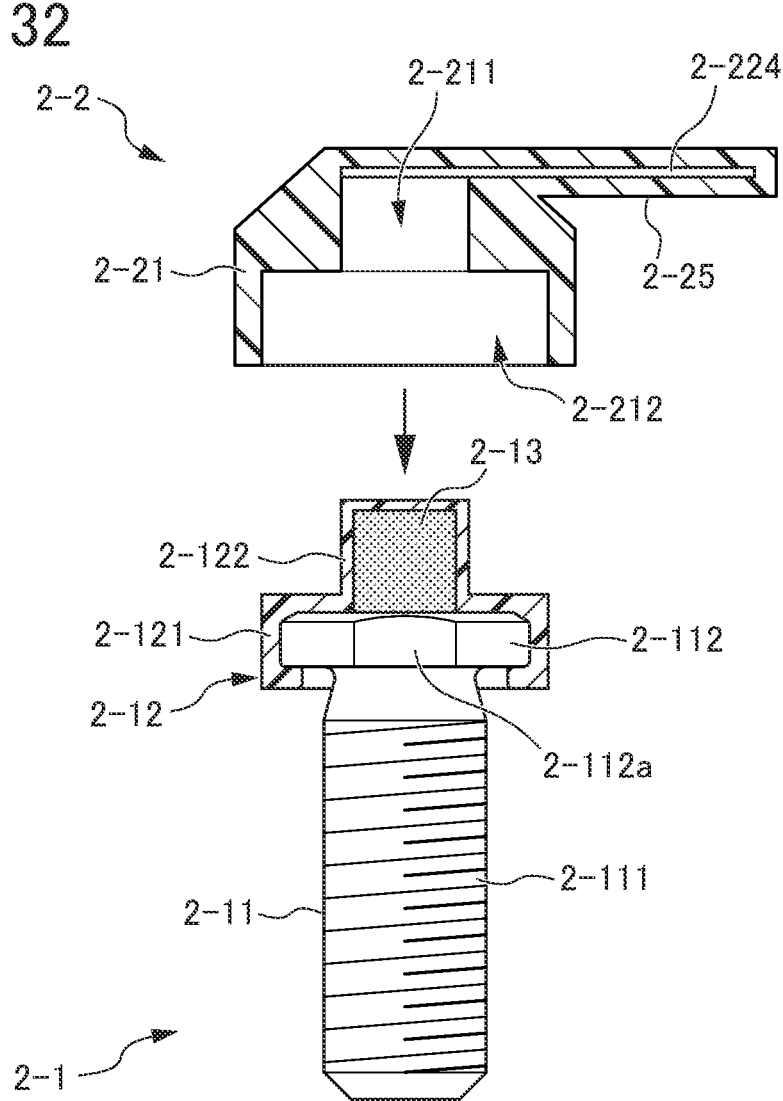
FIG. 32 is a cross-sectional front view showing a head unit of an RFID tag-equipped mounting member and an RFID tag mount unit according to Embodiment 2-4 of the present invention.
Figure 33:
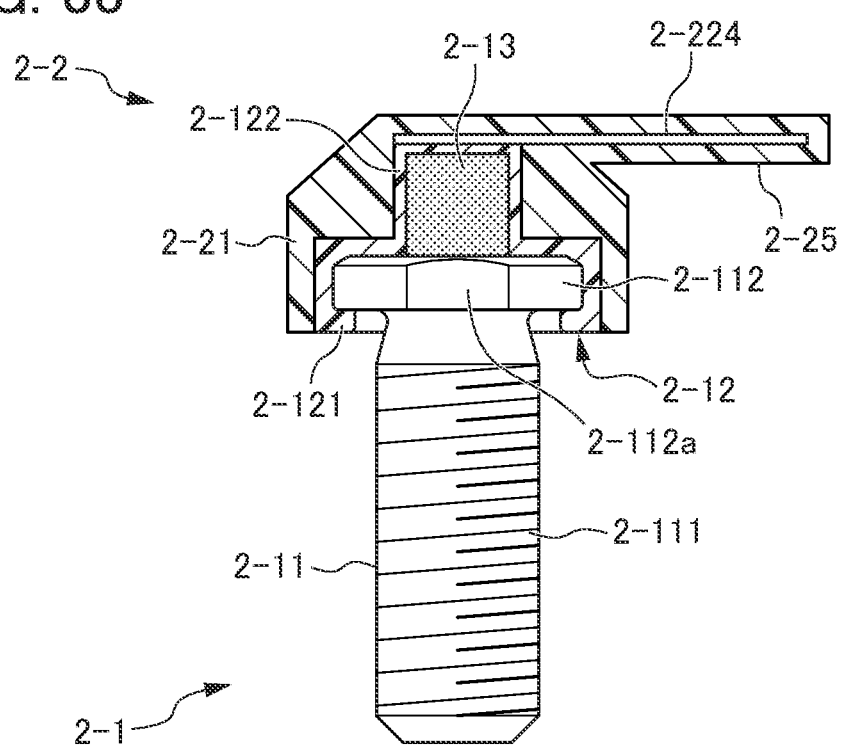
FIG. 33 is a cross-sectional front view showing the RFID tag-equipped mounting member according to Embodiment 2-4 of the present invention.

An RFID tag-equipped mounting member according to Embodiment 2-4 of the present invention will be described with reference to FIGS. 32 and 33. FIG. 32 is a cross-sectional front view showing a head unit and an RFID tag mount unit of the RFID tag-equipped mounting member according to Embodiment 2-4 of the present invention. FIG. 33 is a cross-sectional front view showing the RFID tag-equipped mounting member according to Embodiment 2-4 of the present invention.

As shown in FIG. 32, an RFID tag-equipped bolt according to Embodiment 2-4 includes an RFID tag mount unit 1 and a head unit 2-2. The RFID tag mount unit 2-1 includes a shaft-shaped unit 2-11 which is the same as in Embodiment 2-1, and a pedestal 2-12 and an RFID tag 2-13 which are substantially the same as in Embodiment 2-1.

The pedestal 12 includes an expansion portion 2-121 and a protrusion portion 2-122 as in Embodiment 2-3. The expansion portion 2-121 surrounds a base portion 2-112 of the shaft-shaped unit 2-11. The protrusion portion 2-122 protrude from the base portion 2-112 in a plate shape. The RFID tag 2-13 is fixed to one surface (here, referred to as an "upper surface") of the protrusion portion 2-122 with an adhesive. However, a dent portion (not shown) may be formed from the upper surface to a rear surface of the protrusion portion 2-122, and the RFID tag 2-13 may be fitted into the dent portion. In any case, a base end edge (a lower edge in the drawing) of the RFID tag 2-13 is in contact with a top surface of the base portion 2-112 of the shaft-shaped unit 2-11.

The head unit 2-2 includes a cap 2-21 covering main parts of the pedestal 2-12 of the RFID tag mount unit 2-1, and a boost antenna 2-224. The head unit 2-2 is molded separately from the pedestal 2-12 and is detachably attached thereto.

Unlike Embodiment 2-1, the cap 2-21 of the RFID tag-equipped mounting member according to Embodiment 2-4 includes a columnar cap 2-21 and a single flat plate-shaped rib 2-25 extending in one direction. The cap 2-21 is formed with a recessed fitting portion 2-211, into which the protrusion portion 2-122 of the pedestal 12 is inserted, and a stepped hole 2-212. The flat plate-shaped rib 2-25 protrudes in one direction from the vicinity of the tip of the cap 2-21 in a cross-sectional direction.

The boost antenna 2-224 includes a conductor plate which is embedded in the single flat plate-shaped rib 2-25. The boost antenna 2-224 is embedded in the rib 2-25 except for the base end thereof. In other words, the base end of the boost antenna 2-224 is exposed inside the recessed fitting portion 2-211 of the cap 2-21. Although not shown, the base end of the boost antenna 2-224 may be shallowly embedded inside the recessed fitting portion 2-211 of the cap 2-21. As shown in FIG. 33, when the cap 2-21 is mounted on the pedestal 2-12, the RFID tag 2-13 faces not only the base portion 112 of the shaft-shaped unit 2-11 but also the base end of the boost antenna 2-224 so as to be capacitively coupled. The base end of the boost antenna 2-224 has both functions of a magnetic coupling type antenna and a capacitive coupling type antenna.

Although not shown, the RFID tag-equipped bolt includes various types of head units 2 provided with boost antennas 2-224 having different widths and lengths and boost antennas 2-224 extending in two or more directions. Various head units 2-2 are selected according to attaching situations.

Since the RFID tag-equipped bolt includes the boost antenna 2-224, even when the RFID tag 2-13 is a passive type that transmits and receives weak radio waves, the radio waves are boosted and the directivity in the cross-sectional direction is improved, whereby it is possible to reliably transmit and receive the radio waves to and from the reader/writer.

Other Embodiments of Second Embodiment

The RFID tag-equipped bolt as an example for the RFID tag-equipped mounting member, the head unit of the RFID tag-equipped mounting member, and the RFID tag mount unit according to the embodiment of the present invention is not limited to the contents described above, and includes modifications and improvements within the scope of achieving the object of the present invention.

For example, in the second embodiment, the insert portion 2-111 is the shaft-shaped male screw. However, the insert portion 2-111 may be a pin without a male screw, and the pin is not limited to be columnar, and may be prismatic.

In the second embodiment, the base portion 2-112 is formed in the disc shape. However, the base portion 2-112 may be polygonal. In the above-described embodiment, the outer peripheral surface of the base portion 2-112 is formed with the chamfered portion 2-112a, and the head unit 2-2 includes the locking portion that joins with the chamfered portion 2-112a. However, the outer peripheral surface of the base portion 2-112 may be formed with a knurl without being formed with the chamfered portion 2-112a, and the inner surface of the head unit 2-2 may enter the knurl. Further, when the base portion 2-112 and the head unit 2-2 are fixed and integrated, the base portion 2-112 may not be formed with the chamfered portion 2-112a, and the head unit 2-2 may not include the locking portion.

Further, in the second embodiment, the RFID tag mount unit includes the base portion 2-112. However, the RFID tag mount unit 2-1 does not include the base portion 2-112, one end of the shaft-shaped unit 2-11 is used as the pedestal 2-12, and the head unit 2 may be detachably attached to the pedestal 2-12.

In the second embodiment, the insert portion 2-111 and the base portion 2-112 are made of metal. However, either or both of the insert portion 2-111 and the base portion 2-112 may be formed with resin.

In the second embodiment, various head units 2-2 described in each Embodiment can be changed in each Embodiment. However, the head unit 2-2 can be exchanged with a head unit of different embodiments according to the user's application. The head unit 2-2 of the different embodiment can cope with simply by increasing the types of boost antennas 2-221 to 2-224, and makes it possible to reduce costs.

The second Embodiment has been described in which the head unit of the RFID tag-equipped mounting member, the RFID tag mount unit, and the RFID tag-equipped mounting member are provided as a set for each of Embodiments 2-1 to 2-4. However, the head unit of the RFID tag-equipped mounting member, the RFID tag mount unit, and the RFID tag-equipped mounting member described in each embodiment are not provided as a set, but can be manufactured, handed over, or used individually. Therefore, the user selects an appropriate head unit of the RFID tag-equipped mounting member when using the RFID tag-equipped mounting member, the selected head unit of the RFID tag-equipped mounting member, the RFID tag mount unit, and the RFID tag-equipped mounting member can cope with sensitivity characteristics of wireless communication that vary variously and diversely depending on usage situations.

In the second embodiment, the case has been described in which the RFID tag-equipped bolt is used to manage the mold to be managed. However, the RFID tag-equipped bolt can also be used in a logistics field, a railway field, and a food industry, for example. In the logistics field, the RFID tag-equipped bolt is screwed into bodies of trucks and containers to manage the distribution of products. In the railway field, slackness of the bolt is managed. Such a bolt may have a larger size than a case of being screwed into the mold to be managed. In the food industry, the RFID tag-equipped bolt may be attached to plates at conveyor belt sushi restaurants to manage the elapsed time of sushi placed on the plates or to directly deliver sushi to customers who have ordered individually.

SUMMARY

In summary, the RFID tag-equipped mounting member according to the present invention can implement various embodiments as long as having the following configurations.

An RFID tag-equipped mounting member according to the present invention includes:
  a shaft-shaped unit 1 or 2-11 including an insert portion 1-11 or 2-111 having a shaft shape and a base portion 12 or 2-112 provided at one end of the insert portion 1-11 or 2-111 so as to protrude in a width direction;
  an RFID tag 1-3 or 2-13 that transmits and receives radio waves;
  a boost antenna 1-4 and 2-221 that boosts the radio waves transmitted and received by the RFID tag 1-3 or 2-13; and a head unit 1-2 or 2-2 that seals and embeds at least the boost antenna 1-4 or 2-221.

Since the RFID tag-equipped mounting member includes the boost antenna 1-4 or 2-221 for boosting the radio waves transmitted to and received from the RFID tag 1-3 or 2-13, even when the RFID tag 1-3 or 2-13 is a passive type that transmits and receives weak radio waves, it is possible to reliably transmit and receive the radio waves. Further, the RFID tag-equipped mounting member, in which the RFID tag 1-3 or 2-13 and the boost antenna 1-4 or 2-221 are molded in the head unit 1-2 or 2-2, can be manufactured at low costs such that the RFID tag 1-3 or 2-13 and the boost antenna 1-4 or 2-221 do not fall off from the base portion 1-12 or 2-112 of the shaft-shaped unit 1.

In the RFID tag-equipped mounting member according to the present invention,
  the head unit 1-2 is molded to at least an upper surface of the base portion 1-12 with resin so as to seal the RFID tag 1-3 and the boost antenna 1-4 (first RFID tag-equipped mounting member).

In the (first) RFID tag-equipped mounting member according to the present invention,
  the boost antenna 1-4 is a coil spring-shaped conductor with the RFID tag 1-3 disposed therein.

In the (first) RFID tag-equipped mounting member, since the boost antenna 1-4 is the conductor having the coil spring shape, the directivity of the radio waves can be improved in the radial direction.

In the (first) RFID tag-equipped mounting member according to the present invention,
  the head unit 1-2 includes a pedestal 1-21 that allows the RFID tag 1-3 to be located at an intermediate part or a tip part of the boost antenna 1-4 in a length direction.

In the (first) RFID tag-equipped mounting member, since the RFID tag 1-3 is located at the intermediate part or the tip in the length direction of the boost antenna 1-4 by the pedestal 1-21, even when the base portion 1-12 is attached to be located on the deep side, the RFID tag 1-3 is located on the upper surface, and the radio waves can be transmitted and received satisfactorily.

In the (first) RFID tag-equipped mounting member according to the present invention,
  the head unit 1-2 is formed in a columnar shape or in a truncated cone shape in which a diameter is reduced or enlarged gradually, and
  the boost antenna 1-4 is formed in a cylindrical coil spring shape or a conical coil spring shape that matches an outer shape of the head unit 1-2.

In the (first) RFID tag 1-3, since the boost antenna 1-4 has the cylindrical coil spring shape or the conical coil spring shape, as the distance from the RFID tag 1-3 increases, a radiation surface widens when the boost antenna 1-4 expands, and the radiation surface is concentrated when the boost antenna 1-4 narrows, whereby the communication distance extends. Further, as the shape of the boost antenna 1-4 changes, it is possible to change a sense of size of the head unit 1-2.

In the RFID tag-equipped mounting member according to the present invention,
　　the head unit 1-2 includes a rib 1-24 that is formed in a thumbscrew shape or a flat plate shape to protrude in a radial direction of the insert portion 1-11, and
　　the boost antenna 1-4 expands in a whole of the head unit 1-2 (second RFID tag-equipped mounting member).

In the (second) RFID tag-equipped mounting member, when there is a space in the mounting position, the significantly widened boost antenna 1-4 can be molded inside the rib 1-24 of the head unit 1-2. The radiation direction of the boost antenna 1-4 is orthogonal to the insertion direction of the insert portion 1-11 and is significantly widened, and thus the radiation distance thereof can be extended.

In the (second) RFID tag-equipped mounting member according to the present invention,
　　the boost antenna 1-4 has a meandering conductor pattern.

In the (second) RFID tag-equipped mounting member, the boost antenna 1-4 has the meandering conductor pattern, and thus it can be improved in receiving sensitivity while being manufactured in a small size. Since the boost antenna 1-4 with the meandering conductor pattern is molded inside the rib 1-24 of the head unit 2, it is less likely to be deformed or broken.

In the (second) RFID tag-equipped mounting member according to the present invention,
　　the head unit 1-2 and the meandering boost antenna 1-4 are wider toward a tip side.

In the (second) RFID tag-equipped mounting member, the boost antenna 1-4 with the meandering conductor pattern becomes wider toward the tip side, and thus male transmission/reception strength of the radio waves can be increased.

In the (second) RFID tag-equipped mounting member according to the present invention,
　　the boost antenna 1-4 has a U-shape or a zigzag shape including a plurality of stick-shaped portions 1-42 arranged in parallel in an axial direction of the insert portion 1-11 and a folded portion 1-43 that is folded back at one protruding end side, and
　　the RFID tag 1-3 is sandwiched between the stick-shaped portions 1-42.

In the (second) RFID tag-equipped mounting member, the RFID tag 1-3 is magnetically or capacitively coupled to the boost antenna 1-4 having the stick-shaped portions 1-42.

In the (second) RFID tag-equipped mounting member according to the present invention,
　　the boost antenna 1-4 is a twice-folded member, and
　　the RFID tag 1-3 is sandwiched by the twice-folded member.

In the (second) RFID tag-equipped mounting member, the RFID tag 1-3 is magnetically or capacitively coupled to the boost antenna 1-4 having the stick-shaped portions 1-42.

A manufacturing method for the (first) RFID tag-equipped mounting member according to the present invention is a manufacturing method for the (first) RFID tag-equipped mounting member according to the present invention, the manufacturing method including:
　　a step of fixing the pedestal 1-21 for mounting the RFID tag 1-3 to the base portion 1-12;
　　a step of mounting the RFID tag 1-3 on the pedestal 1-21;
　　a step of setting the boost antenna 1-4 on the pedestal 1-21; and
　　a step of molding the pedestal 1-21, the RFID tag 1-3, and the boost antenna 1-4 with resin to form the head unit 1-2 integrally provided with the pedestal 1-21.

In the manufacturing method for the (first) RFID tag-equipped mounting member according to the present invention, after the pedestal 1-21 is fixed to the base portion 1-12, the RFID is mounted on the pedestal 1-21, and the RFID tag 1-3 and the boost antenna 1-4 can be molded in the head unit 1-2 to set the boost antenna 4.

In the manufacturing method for the (first) RFID tag-equipped mounting member according to the present invention, the step of fixing the pedestal 1-21 to the base portion 1-12 includes:
　　a step of forming a fitting recess 1-122 in the base portion 1-12; and
　　a step of forming a fitting projection 1-213 on the pedestal 1-21 and fitting the fitting projection 1-213 into the fitting recess 1-122.

In the manufacturing method for the (first) RFID tag-equipped mounting member according to the present invention, the fitting recess 1-122 is formed in the base portion 1-12, and the fitting projection 1-213 of the pedestal 1-21 is fitted into the recess, whereby the head unit 1-2 molded with the resin such that the base portion 1-12 and the pedestal 1-21 are not misaligned can be formed.

A manufacturing method for the (first) RFID tag-equipped mounting member different from the above-described manufacturing method according to the present invention is a manufacturing method for the (first) RFID tag-equipped mounting member according to the present invention, the manufacturing method including:
　　a step of fixing the pedestal 1-21 for mounting the RFID tag 1-3 to the base portion 1-12;
　　a step of setting the boost antenna 1-4 on the base portion 1-12;
　　a step of insert-molding an original form of the head unit 1-2 with resin so as to embed the boost antenna 1-4;
　　a step of forming a hole extending toward a central portion 1-23 from a top surface of the original form of the head unit 1-2 and mounting the RFID tag 1-3 inside the hole; and
　　a step of filling the hole with molten resin or inserting a resin plug into the hole to form the head unit 1-2.

In the manufacturing method for the (first) RFID tag-equipped mounting member according to the present invention, after the original form of the head unit 1-2 is formed, the hole is formed in the top surface of the original form of the head unit 1-2, and the RFID tag 1-3 is mounted on the deep side of the hole. The hole is filled with the resin, or the resin plug is inserted into the hole, and thus the head unit 1-2 is formed.

A manufacturing method for the (second) RFID tag-equipped mounting member according to the present invention is a manufacturing method for the (second) RFID tag-equipped mounting member according to the present invention, the manufacturing method including:
　　a step of in-mold semi-molding one side half of the head unit 1-2 so as to have a recess for fitting the boost antenna 1-4 and include the base portion 1-12 of the shaft-shaped unit 1-1;
　　a step of setting the RFID tag 1-3 and the boost antenna 1-4 in the recess; and
　　a step of in-mold semi-molding another side half of the head unit 1-2 so as to cover the RFID tag 1-3 and the boost antenna 1-4.

In the manufacturing method for the (second) RFID tag-equipped mounting member, the RFID tag 1-3 and the boost antenna 1-4 are set on one half of the head unit 1-2 subjected to the in-mold semi-molding, and the other half thereof is subjected to the in-mold semi-molding.

A manufacturing method for the (second) RFID tag-equipped mounting member different from the above-described manufacturing method according to the present invention includes:
- a step of in-mold semi-molding one side half of the head unit 1-2 so as to have a positioning boss 1-25 for positioning the boost antenna 1-4 and include the base portion 1-12 of the shaft-shaped unit 1;
- a step of positioning the RFID tag 1-3 and the boost antenna 1-4 using the positioning boss and setting the RFID tag and the boost antenna in the insert portion 1-11; and
- a step of in-mold semi-molding another side half of the head unit 1-2 so as to cover the RFID tag 1-3 and the boost antenna 1-4.

In the manufacturing method for the (second) RFID tag-equipped mounting member different from the above-described manufacturing method, the positioning boss is provided on one half of the head unit 1-2 subjected to the in-mold semi-molding, the RFID tag 1-3 and the boost antenna 1-4 are positioned by the positioning boss, and the other half thereof is subjected to the in-mold semi-molding.

A head unit 2-2 of an RFID tag-equipped mounting member according to the present invention is
a head unit of the RFID tag-equipped mounting member provided in the RFID tag-equipped mounting member according to the present invention, the head unit being configured to be capable of being detachably attached to an RFID tag mount unit 2-1 including the shaft-shaped unit, the RFID tag 2-13, and a pedestal 2-12 having a protrusion portion 2-122, the head unit including a cap having a recessed fitting portion 2-211 into which the protrusion portion 2-122 is inserted.

Since the head unit 2-2 of the RFID tag-equipped mounting member includes the boost antennas 2-221 to 2-224 for boosting the radio waves transmitted to and received from the RFID tag 2-13, even when the RFID tag 2-13 is a passive type that transmits and receives weak radio waves, it is possible to reliably transmit and receive the radio waves. Further, the head unit 2-2 with the boost antenna 2-221 is mounted on the protrusion portion 2-122 of the RFID tag mount unit 2-1. For this reason, the RFID tag mount unit 2-1 can be detachably attached to the head unit 2-2 with the boost antenna 2-221. Therefore, the head unit 2-2 of the RFID tag-equipped mounting member can be adapted to the required sensitivity characteristics by changing the head unit 2 with the boost antenna 2-221 even when usage situations in maintenance such as process management and inventory management on a manufacturing line is changed.

In the head unit 2-2 of the RFID tag-equipped mounting member according to the present invention,
the RFID tag mount unit 2-1 includes a base portion 2-112 in which the shaft-shaped unit 2-11 protrudes in a cross-sectional direction at one end, and the pedestal 2-12 includes an expansion portion 2-121 surrounding the base portion 2-112, and
the cap 2-21 includes a stepped hole 2-212 into which the expansion portion is inserted.

In the head unit 2-2 of the RFID tag-equipped mounting member, since the expansion portion 2-121 of the pedestal 2-12 surrounds the base portion 2-112 protruding from one end of the shaft-shaped unit 2-11 of the RFID tag mount unit 2-1, a contact surface between the shaft-shaped unit 2-11 and the cap 2-21 increases, and the shaft-shaped unit 2-11 can be easily turned when the cap 2-21 is turned.

In the head unit 2-2 of the RFID tag-equipped mounting member according to the present invention,
the boost antenna 2-221 includes an element formed in a coil shape, and
the cap 2-21 is formed in a one end closed tube shape.

In the head unit 2-2 of the RFID tag-equipped mounting member, since the boost antenna 2-221 is the element formed in the coil spring shape, the directivity of the radio waves can be improved in the cross-sectional direction.

In the head unit 2-2 of the RFID tag-equipped mounting member according to the present invention,
the boost antenna 2-222 or 2-224 includes a shaft-shaped or conductive flat plate protruding in the cross-sectional direction of the shaft-shaped unit, and
the cap 2-21 includes a rib 2-23 that molds the boost antenna 2-222 or 2-224.

In the head unit 2-2 of the RFID tag-equipped mounting member, the boost antenna 2-222 or 2-224 includes the shaft-shaped or conductive flat plate, and thus the boost antenna 2-222 or 2-224 can be formed in a simple shape.

In the head unit 2-2 of the RFID tag-equipped mounting member according to the present invention,
the boost antenna 2-222 or 2-224 includes an element having a loop portion 2-222a surrounding the RFID tag, and
the cap 2-21 includes a central portion that molds the loop portion 2-222a.

The head unit 2-2 of the RFID tag-equipped mounting member includes the loop portion 2-222a surrounding the RFID tag 2-13, and thus it is possible to boost weaker radio waves.

In the head unit 2-2 of the RFID tag-equipped mounting member according to the present invention,
the boost antenna 2-223 is patterned in a meandering shape and includes an element protruding in the cross-sectional direction of the shaft-shaped unit 2-11, and
the cap 2-21 includes a rib 2-24 that molds the element.

In the head unit 2-2 of the RFID tag-equipped mounting member, the boost antenna 2-223 has the meandering conductor pattern, and thus it can be improved in receiving sensitivity while being manufactured in a small size. Since the boost antenna 2-223 with the meandering conductor pattern is molded inside the rib 2-24 of the head unit 2-2, it is less likely to be deformed or broken.

An RFID tag mount unit 2-1 according to the present invention is
capable of being detachably attached to a head unit 2-2 of an RFID tag-equipped mounting member in which a boost antennas 2-221 to 2-224 for boosting radio waves transmitted and received by an RFID tag and a cap 2-21 formed in a one end closed tube shape to mold the boost antennas 2-221 to 2-224 are integrated, the RFID tag mount unit including:
a shaft-shaped unit 2-11 including an insert portion having a shaft shape; a pedestal 2-12 fixed to one end of the shaft-shaped unit 2-11; and an RFID tag 2-13 mounted on the pedestal 2-12 to transmit and receive the radio waves.

Since the RFID tag mount unit 2-1 includes the boost antennas 2-221 to 2-224 for boosting the radio waves transmitted to and received from the RFID tag 2-13, even when the RFID tag 2-13 is a passive type that transmits and receives weak radio waves, it is possible to reliably transmit and receive the radio waves. Further, the head unit 2-2 with the boost antenna 2-221 is mounted on the protrusion portion 2-122 of the RFID tag mount unit 2-1. For this reason, the RFID tag mount unit 2-1 can be detachably attached to the head unit 2-2 with the boost antenna 2-221. Therefore, the head unit 2-2 of the RFID tag-equipped mounting member can be adapted to the required sensitivity characteristics by changing the head unit 2-2 with the boost antenna 2-221 even when usage situations in maintenance such as process management and inventory management on a manufacturing line is changed.

In the RFID tag mount unit according to the present invention, the shaft-shaped unit 2-11 includes a base portion 2-112 that protrudes in a cross-sectional direction at one end of the insert portion and is surrounded by an expansion portion 2-121 provided on the pedestal 2-12 of the head unit 2-2 of the RFID tag-equipped mounting member.

In the RFID tag mount unit 2-1, the shaft-shaped unit 2-11 includes the base portion 2-112, and the base portion 2-112 is surrounded by the expansion portion 2-121 provided on the pedestal 2-12 of the head unit 2-2 of the RFID tag-equipped mounting member, whereby when the head unit 2-2 is turned, it is possible to easily cope with tightening with high torque.

An RFID tag-equipped mounting member according to the present invention includes:

an RFID tag mount unit including a shaft-shaped unit 2-11 having a shaft-shaped insert portion, a pedestal 2-12 fixed to one end of the shaft-shaped unit 2-11 and having a protrusion portion 2-122, and an RFID tag 2-13 mounted on the pedestal 2-12 to transmit and receive radio waves; and a head unit 2-2 of the RFID tag-equipped mounting member including boost antennas 2-221 to 2-224 that boost the radio waves transmitted and received by the RFID tag and a cap 2-21 that molds the boost antennas 2-221 to 2-224 and is formed with a recessed fitting portion 2-211 into which the protrusion portion 2-122 is inserted, and when the protrusion portion 2-122 of the pedestal of the RFID tag mount unit 2-1 is inserted into the recessed fitting portion 2-211 of the cap 2-21, the RFID tag mount unit is attached to the head unit 2-2 of the RFID tag-equipped mounting member such that the boost antenna 2-221 surrounds the RFID tag 2-13, and when the pedestal 2-12 of the RFID tag mount unit 2-1 is removed from the recessed fitting portion 2-211 of the cap 2-21, the RFID tag mount unit 2-1 is separated from the head unit 2-2 of the RFID tag-equipped mounting member.

Since the RFID tag-equipped mounting member includes the boost antennas 2-221 to 2-224 for boosting the radio waves transmitted to and received from the RFID tag 2-13, even when the RFID tag 2-13 is a passive type that transmits and receives weak radio waves, it is possible to reliably transmit and receive the radio waves. Further, the head unit 2-2 with the boost antennas 2-221 to 2-224 is mounted on the protrusion portion 122 of the RFID tag mount unit 2-1. For this reason, the RFID tag mount unit 2-1 can be detachably attached to the head unit 2-2 with the boost antennas 2-221 to 2-224. Therefore, the head unit 2-2 of the RFID tag-equipped mounting member can cope with simply by increasing the types of boost antennas 221 to 224, and can be adapted to the required sensitivity characteristics by changing the head unit 2-2 with the boost antenna 2-221 even when usage situations in maintenance such as process management and inventory management on a manufacturing line is changed, thereby making it possible to reduce costs.

In the RFID tag-equipped mounting member according to the present invention, the shaft-shaped unit 2-11 includes a base portion 2-112 provided at one end of the insert portion so as to protrude in a width direction, and the pedestal 2-12 includes an expansion portion 2-121 that surrounds the base portion.

In the RFID tag-equipped mounting member according to the present invention, the shaft-shaped unit 2-11 includes the base portion 2-112, and the base portion 2-112 is surrounded by the expansion portion 2-121 provided on the pedestal 2-12 of the head unit 2-2 of the RFID tag-equipped mounting member, whereby when the head unit 2-2 is turned, it is possible to easily cope with tightening with high torque.

EXPLANATION OF REFERENCE NUMERALS 1-1 . . . shaft-shaped unit
1-11 . . . insert portion
1-12 . . . base portion
1-122 . . . fitting recess
1-2 . . . head unit
1-21 . . . pedestal
1-211 . . . enlarged diameter portion
1-212 . . . protrusion portion
1-213 . . . fitting projection
1-22 . . . cap
1-23 . . . central portion
1-24 . . . rib
1-25 . . . positioning boss
1-3 . . . RFID tag
1-4 . . . boost antenna
1-1-42 . . . stick-shaped portions
1-43 . . . folded portion
2-1 . . . RFID tag mount unit
2-11 . . . shaft-shaped unit
2-111 . . . insert portion
2-112 . . . base portion
2-12 . . . pedestal
2-121 . . . expansion portion
2-122 . . . protrusion portion
2-13 . . . RFID tag
2-2 . . . head unit
2-21 . . . cap
2-211 . . . recessed fitting portion
2-212 . . . stepped hole
2-221 . . . boost antenna
2-222 . . . boost antenna
2-222a . . . loop portion
2-222b . . . straight portion
2-223 . . . boost antenna
2-224 . . . boost antenna
2-23 . . . rib
2-24 . . . rib
2-25 . . . rib

The invention claimed is:
1. An RFID tag-equipped mounting member comprising:
a shaft-shaped unit including an insert portion having a shaft shape and a base portion provided at one end of the insert portion so as to protrude in a width direction;
an RFID tag that transmits and receives radio waves;
a boost antenna that boosts the radio waves transmitted and received by the RFID tag; and
a head unit that seals and embeds at least the boost antenna,
wherein the head unit is molded to at least an upper surface of the base portion with resin so as to seal the RFID tag and the boost antenna.

2. The RFID tag-equipped mounting member according to claim 1, wherein the boost antenna is a coil spring-shaped conductor with the RFID tag disposed therein.

3. The RFID tag-equipped mounting member according to claim 2, wherein the head unit is formed in a columnar shape or in a truncated cone shape in which a diameter is reduced or enlarged gradually, and
the boost antenna having the coil spring shape is formed in a cylindrical shape or a conical shape that matches an outer shape of the head unit.

4. The RFID tag-equipped mounting member according to claim 1, wherein the head unit includes a pedestal that allows the RFID tag to be located at an intermediate part or a tip part of the boost antenna in a length direction.

5. A manufacturing method for the RFID tag-equipped mounting member according to claim 4, comprising:
a step of fixing the pedestal for mounting the RFID tag to the base portion;
a step of mounting the RFID tag on the pedestal;
a step of setting the boost antenna on the pedestal; and
a step of molding the pedestal, the RFID tag, and the boost antenna with resin to form the head unit integrally provided with the pedestal.

6. The manufacturing method for the RFID tag-equipped mounting member according to claim 5, wherein the step of fixing the pedestal to the base portion includes:
a step of forming a fitting recess in the base portion; and
a step of forming a fitting projection on the pedestal and fitting the fitting projection into the fitting recess.

7. A manufacturing method for the RFID tag-equipped mounting member according to claim 4, comprising:
a step of fixing the pedestal for mounting the RFID tag to the base portion;
a step of setting the boost antenna on the base portion;
a step of insert-molding an original form of the head unit with resin so as to embed the boost antenna;
a step of forming a hole extending toward a central portion from a top surface of the original form of the head unit and mounting the RFID tag inside the hole; and
a step of filling the hole with molten resin or inserting a resin plug into the hole to form the head unit.

8. The RFID tag-equipped mounting member according to claim 1, wherein the head unit includes a rib that is formed in a thumbscrew shape or a flat plate shape to protrude in a radial direction of the insert portion, and
the boost antenna expands in a whole of the head unit.

9. The RFID tag-equipped mounting member according to claim 8, wherein the boost antenna has a meandering conductor pattern.

10. The RFID tag-equipped mounting member according to claim 8, wherein the boost antenna has a U-shape or a zigzag shape including a plurality of stick-shaped portions arranged in parallel in an axial direction of the insert portion and a folded portion that is folded back at one protruding end side, and
the RFID tag is sandwiched between the stick-shaped portions.

11. The RFID tag-equipped mounting member according to claim 8, wherein the boost antenna is a twice-folded member, and
the RFID tag is sandwiched by the twice-folded member.

12. A manufacturing method for the RFID tag-equipped mounting member according to claim 8, comprising:
a step of in-mold semi-molding one side half of the head unit so as to have a recess for fitting the boost antenna and include the base portion of the shaft-shaped unit;
a step of setting the RFID tag and the boost antenna in the recess; and
a step of in-mold semi-molding another side half of the head unit so as to cover the RFID tag and the boost antenna.

13. A manufacturing method for the RFID tag-equipped mounting member according to claim 8, comprising:
a step of in-mold semi-molding one side half of the head unit so as to have a positioning boss for positioning the boost antenna and include the base portion of the shaft-shaped unit;
a step of positioning the RFID tag and the boost antenna using the positioning boss and setting the RFID tag and the boost antenna in the insert portion; and
a step of in-mold semi-molding another side half of the head unit so as to cover the RFID tag and the boost antenna.

14. A head unit of an RFID tag-equipped mounting member, the head unit being provided in the RFID tag-equipped mounting member according to claim 1,
the head unit being configured to be detachably attached to an RFID tag mount unit including the shaft-shaped unit, the RFID tag, and a pedestal having a protrusion portion,
the head unit comprising a cap having a recessed fitting portion into which the protrusion portion is inserted.

15. The head unit of an RFID tag-equipped mounting member according to claim 14, wherein the RFID tag mount unit includes a base portion in which the shaft-shaped unit protrudes in a cross-sectional direction at one end, and the pedestal includes an expansion portion surrounding the base portion, and
the cap includes a stepped hole into which the expansion portion is inserted.

16. The head unit of an RFID tag-equipped mounting member according to claim 14, wherein the boost antenna includes an element formed in a coil shape, and
the cap is formed in a cylindrical shape in which one end is closed.

17. An RFID tag mount unit configured to be detachably attached to a head unit of an RFID tag-equipped mounting member in which a boost antenna for boosting radio waves transmitted and received by an RFID tag and a cap formed in a cylindrical shape with one end closed to mold the boost antenna are integrated, the RFID tag mount unit comprising:
a shaft-shaped unit including an insert portion having a shaft shape;
a pedestal fixed to one end of the shaft-shaped unit; and
an RFID tag mounted on the pedestal to transmit and receive the radio waves, wherein
when the RFID tag mount unit is detachably attached to the head unit of the RFID tag-equipped mounting member, the boost antenna surrounds the RFID tag.

18. The RFID tag mount unit according to claim 17, wherein the shaft-shaped unit includes a base portion that protrudes in a cross-sectional direction at one end of the insert portion and is surrounded by an expansion portion provided on the pedestal of the head unit of the RFID tag-equipped mounting member.

19. An RFID tag-equipped mounting member comprising:
an RFID tag mount unit including a shaft-shaped unit having a shaft-shaped insert portion, a pedestal fixed to one end of the shaft-shaped unit and having a protrusion portion, and an RFID tag mounted on the pedestal to transmit and receive radio waves; and
a head unit of the RFID tag-equipped mounting member including a boost antenna that boosts the radio waves transmitted and received by the RFID tag and a cap that molds the boost antenna and is formed with a recessed fitting portion into which the protrusion portion is inserted, wherein when the protrusion portion of the pedestal of the RFID tag mount unit is inserted into the recessed fitting portion of the cap, the RFID tag mount unit is attached to the head unit of the RFID tag-equipped mounting member such that the boost antenna surrounds the RFID tag, and when the pedestal of the RFID tag mount unit is removed from the recessed fitting portion of the cap, the RFID tag mount unit is separated from the head unit of the RFID tag-equipped mounting member.

* * * * *